United States Patent
Kido et al.

(10) Patent No.: US 10,047,479 B2
(45) Date of Patent: Aug. 14, 2018

(54) PRINTING AGENT, PRINTED FABRIC, AND METHOD FOR PRODUCING PRINTING AGENT

(71) Applicant: DIC Corporation, Tokyo (JP)

(72) Inventors: Tomoko Kido, Saitama (JP); Yukie Uemura, Osaka (JP); Toshihisa Kimura, Saitama (JP); Hisakazu Tanaka, Osaka (JP); Yasuo Oji, Osaka (JP); Nobuhiro Oe, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 15/545,653

(22) PCT Filed: Jan. 21, 2016

(86) PCT No.: PCT/JP2016/051680
§ 371 (c)(1),
(2) Date: Jul. 21, 2017

(87) PCT Pub. No.: WO2016/117639
PCT Pub. Date: Jul. 28, 2016

(65) Prior Publication Data
US 2018/0016743 A1    Jan. 18, 2018

(30) Foreign Application Priority Data
Jan. 23, 2015 (JP) .................. 2015-011220

(51) Int. Cl.
*C08G 18/08* (2006.01)
*C08L 55/00* (2006.01)
(Continued)

(52) U.S. Cl.
CPC .............. *D06P 1/525* (2013.01); *C08L 53/00* (2013.01); *C08L 53/005* (2013.01); *D06P 1/14* (2013.01); *D06P 1/5285* (2013.01)

(58) Field of Classification Search
CPC .......... D06P 1/525; D06P 1/5285; D06P 1/14; C08F 293/005; C08L 53/00; C08L 53/005; C09B 67/0066; C09B 67/009
(Continued)

(56) References Cited

U.S. PATENT DOCUMENTS

| 5,760,124 A | 6/1998 | Listigovers et al. |
| 2008/0314292 A1 | 12/2008 | Shimanaka et al. |

(Continued)

FOREIGN PATENT DOCUMENTS

| JP | H10-007955 A | 1/1998 |
| JP | 2009-024165 A | 2/2009 |

(Continued)

OTHER PUBLICATIONS

Search Report issued in corresponding International Patent Application No. PCT/JP2016/051680, dated Apr. 19, 2016.

*Primary Examiner* — William K Cheung
(74) *Attorney, Agent, or Firm* — McDermott Will & Emery LLP

(57) ABSTRACT

Provided is a printing agent including a pigment, a pigment dispersant, water, an organic solvent, and a binder resin, the pigment dispersant being a polymer (A) including an anionic group, the polymer (A) having a solubility in water of 0.1 g/100 ml or less, a number-average molecular weight of 1000 to 6000, and an acid value of 40 to 400 mgKOH/g. Also provided is a printed fabric produced by applying the printing agent on a fabric. The polymer (A) is preferably a polymer represented by General Formula (1) (where $A^1$ represents a residue of an organolithium initiator; $A^2$ represents a polymer block including a monomer having an aromatic ring or a heterocyclic ring; $A^3$ represents a polymer (Continued)

block including an anionic group; n represents an integer of 1 to 5; and B represents an aromatic group or an alkyl group).

7 Claims, 1 Drawing Sheet

(51) Int. Cl.
*C04B 35/634* (2006.01)
*D06P 1/52* (2006.01)
*D06P 1/14* (2006.01)
*C08L 53/00* (2006.01)

(58) Field of Classification Search
USPC .................................. 524/507, 561, 553
See application file for complete search history.

(56) References Cited

U.S. PATENT DOCUMENTS

| | | | |
|---|---|---|---|
| 2010/0091052 | A1 | 4/2010 | Ogawa et al. |
| 2011/0223529 | A1* | 9/2011 | Shimanaka ......... C08F 293/005 430/108.4 |

FOREIGN PATENT DOCUMENTS

| | | |
|---|---|---|
| JP | 2009-030014 A | 2/2009 |
| JP | 2009-149774 A | 7/2009 |
| JP | 2010-180353 A | 8/2010 |
| JP | 2015-105361 A | 6/2015 |
| JP | 2015-147888 A | 8/2015 |
| WO | 2006/061995 A1 | 6/2006 |
| WO | 2010/013651 A1 | 2/2010 |
| WO | 2015/072339 A1 | 5/2015 |

* cited by examiner

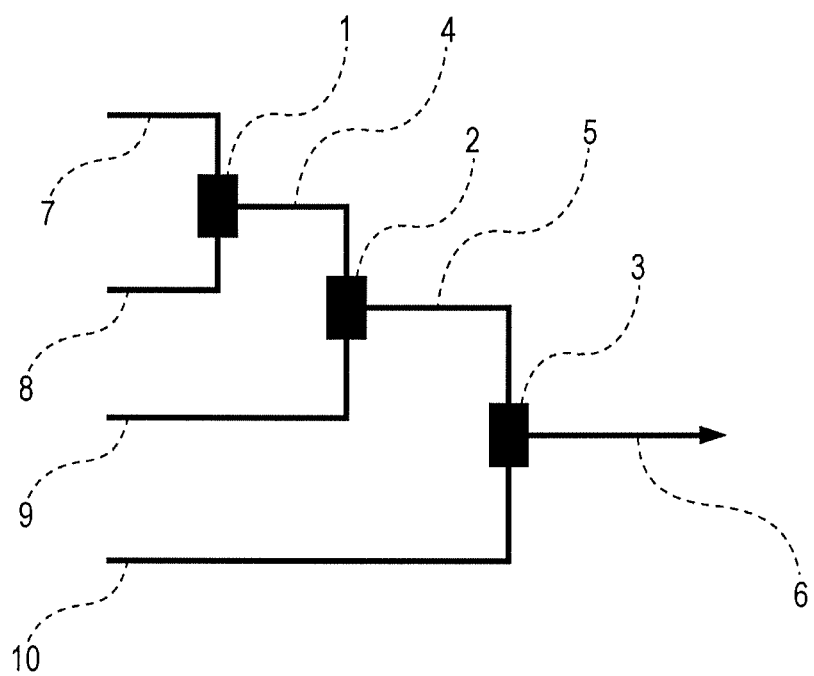

PRINTING AGENT, PRINTED FABRIC, AND METHOD FOR PRODUCING PRINTING AGENT

CROSS REFERENCE

This application is the U.S. National Phase under 35 U.S.C. § 371 of International Application No. PCT/JP2016/051680, filed on Jan. 21, 2016, which claims the benefit of Japanese Application No. 2015-011220, filed on Jan. 23, 2015, the entire contents of each are hereby incorporated by reference.

TECHNICAL FIELD

The present invention relates to a printing agent and a printed fabric produced by applying the printing agent to a fabric.

BACKGROUND ART

One of the known methods for printing an image, such as a character, a drawing, or a pattern, on a fabric, such as a woven fabric, a nonwoven fabric, or a knitted fabric, is pigment printing in which an aqueous pigment ink is used. Pigment printing is a method in which a printing agent that is a pigment composition including a color pigment and a binder resin is applied to a base material and, after a dry-curing step has been conducted as needed, the printing agent is fixed to the base material. Known examples of the above printing method include silk screen printing (e.g., see PTL 1) in which a pattern formed on a screen fabric is sequentially printed on a fabric; and ink jet recording (e.g., see PTL 2) in which an ink ejected from a nozzle is deposited on a fabric.

For preparing a printing agent, commonly, an aqueous dispersion containing a high concentration of a pigment (commonly referred to as "aqueous pigment dispersion" or "pigment dispersion") is diluted with water, and a binder resin and other additives are added to the diluted pigment dispersion. In particular, since pigments are insoluble in water, a method for dispersing a pigment in an aqueous medium with stability has been studied in order to form an aqueous pigment ink by diluting the aqueous pigment dispersion with water.

One of the known methods for dispersing a pigment used for printing is a method in which a resin produced by neutralizing, with a basic substance, an alkyl-(meth)acrylic acid ester monomer, an aliphatic vinyl monomer including a carboxyl group, an aliphatic vinyl monomer including a non-carboxyl-group crosslinkable functional group, and an emulsion polymer having a molecular weight of 2,000 to 20,000 is used as a pigment dispersant (e.g., see PTL 3). In the above method, a crosslinking reaction is conducted at 100° C. or more using a water-soluble fixing agent including a crosslinkable functional group, and a heating step needs to be conducted.

Examples of an aqueous pigment dispersion which does not require a heating step include, in the field of ink jet recording, a method in which a synthetic resin having a specific acid value, a base, and a colorant are sufficiently mixed with one another with a stirring machine or a dispersing device in the presence of an organic solvent, such as a ketone solvent or an alcohol solvent, in order to dissolve or disperse the colorant and make the synthetic resin self-water dispersible, and the resulting colored resin solution is mixed with an aqueous medium such that the small droplets of the self-water dispersible resin solution including the colorant are dispersed in the aqueous medium (e.g., see PTL 4, Paragraph [0024]); a method in which a block polymer compound including a hydrophobic segment and a hydrophilic segment constituted by a hydrophobic unit and a hydrophilic unit is used as a pigment dispersant (e.g., see PTL 5); and a method in which an A-B block polymer ((An-Bm) block polymer) is used as a pigment dispersant, where A represents styrene, B represents acrylic acid, the degree of polymerization of A is about 5 to about 50, and the degree of polymerization of B is about 70 to about 800 (e.g., see PTL 6).

The above methods are suitably used for producing a water-based ink for ink jet recording, but may cause coarse particles to be formed in the ink. In screen printing, coarse particles included in a printing agent increase the likelihood of a screen clogging when the screen is a high-mesh screen. Furthermore, in ink jet recording, the coarse particles may cause ink-ejection failure and degrade the preservation stability of an ink. The printing properties achieved by using printing agents produced by the above methods are not described in the above patent documents.

CITATION LIST

Patent Literature

PTL 1: Japanese Unexamined Patent Application Publication No. 2007-332523
PTL 2: Japanese Unexamined Patent Application Publication No. 2009-215506
PTL 3: Japanese Unexamined Patent Application Publication No. 2012-251062
PTL 4: Japanese Unexamined Patent Application Publication No. 8-183920
PTL 5: Japanese Unexamined Patent Application Publication No. 2008-195769
PTL 6: Japanese Unexamined Patent Application Publication No. 10-7955

SUMMARY OF INVENTION

Technical Problem

It is an object of the present invention to provide a printing agent containing a reduced amount of coarse particles and capable of forming a printed portion having excellent printing properties, that is, in particular, high fastness to rubbing.

Solution to Problem

The inventors of the present invention found that the above-described issues may be addressed by a printing agent including a pigment dispersed therein using a specific polymer.

Accordingly, the present invention provides a printing agent including a pigment, a pigment dispersant, water, an organic solvent, and a binder resin, the pigment dispersant being a polymer (A) including an anionic group, the polymer (A) having a solubility in water of 0.1 g/100 ml or less, a number-average molecular weight of 1000 to 6000, and an acid value of 40 to 400 mgKOH/g.

The present invention also provides a printed fabric produced by applying above-described printing agent to a fabric.

The present invention also provides a method for producing a printing agent, the method including the following steps conducted in this order: a step in which a dispersion mixture including a polymer (A), a basic compound, a water-soluble organic solvent, and a pigment is prepared, the polymer (A) including an anionic group, the polymer (A) having a solubility in water of 0.1 g/100 ml or less, the polymer (A) having a number-average molecular weight of 1000 to 6000, the polymer (A) having an acid value of 40 to 400 mgKOH/g; a step in which the dispersion mixture is mixed with water to form an aqueous pigment dispersion; and a step in which the aqueous pigment dispersion is mixed with a diluent solvent, a binder resin, and an additive for printing agents. is provided.

Advantageous Effects of Invention

The printing agent according to the present invention contains a reduced amount of coarse particles and is capable of forming a printed portion having excellent printing properties, that is, in particular, high fastness to rubbing.

The printing agent according to the present invention can be suitably used in both silk screen printing and ink jet recording.

DESCRIPTION OF EMBODIMENTS (Pigment)

The pigment used in the present invention is not limited; pigments included in inks for screen recording and water-based inks for ink-jet recording, which are commonly used for printing, may be used as a colorant. Specifically, publicly known inorganic pigments and organic pigments capable of being dispersed in water or water-soluble organic solvents may be used. Examples of the inorganic pigments include titanium oxide, iron oxide, and carbon blacks produced by publicly known methods, such as a contact method, a furnace method, and a thermal method. Examples of the organic pigments include azo pigments (e.g., azo lake, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigment), dye chelates (e.g., basic dye chelates and acidic dye chelates), nitro pigments, nitroso pigments, and aniline black.

Specific examples of the pigments that are carbon blacks include No. 2300, No. 2200B, No. 900, No. 980, No. 33, No. 40, No, 45, No. 45L, No. 52, HCF88, MCF88, MA7, MA8, and MA100 produced by Mitsubishi Chemical Corporation; Raven 5750, Raven 5250, Raven 5000, Raven 3500, Raven 1255, and Raven 700 produced by Columbian Chemicals Company, Inc.; Regal 400R, Regal 330R, Regal 660R, Mogul L, Mogul 700, Monarch 800, Monarch 880, Monarch 900, Monarch 1000, Monarch 1100, Monarch 1300, and Monarch 1400 produced by Cabot Corporation; and Color Black FW1, Color Black FW2, Color Black FW2V, Color Black FW18, Color Black FW200, Color Black 5150, Color Black 5160, Color Black S170, Printex 35, Printex U, Printex V, Printex 1400U, Special Black 6, Special Black 5, Special Black 4, Special Black 4A, NIPEX 150, NIPEX 160, NIPEX 170, and NIPEX 180 produced by Degussa.

Specific examples of the pigments used as a yellow ink include C.I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, and 185.

Specific examples of the pigments used as a magenta ink include C.I. Pigment Violet 19, C.I. Pigment Red 5, 7, 12, 48(Ca), 48(Mn), 57(Ca), 57:1, 112, 122, 123, 146, 168, 176, 184, 185, 202, and 209; and a mixture or a solid solution including two or more pigments selected from the above pigments.

Specific examples of the pigments used as a cyan ink include C.I. Pigment Blue 1, 2, 3, 15, 15:3, 15:4, 15:6, 16, 22, 60, 63, and 66.

As a specific example of the pigments used as a red ink, one or two pigments selected from the group consisting of C.I. Pigment Red 17, 49:2, 112, 149, 150, 177, 178, 179, 188, 254, 255, and 264 are preferably used.

Specific examples of the pigments used as an orange ink include C.I. Pigment Orange 1, 2, 5, 7, 13, 14, 15, 16, 24, 34, 36, 38, 40, 43, 63, 64, 71, 73, and 81.

Specific examples of the pigments used as a green ink include C.I. Pigment Green 7, 10, 36, 58, and 59.

Specific examples of the pigments used as a violet ink include C.I. Pigment Violet 19, 23, 32, 33, 36, 38, 43, and 50.

In the present invention, a pigment that is provided with a water dispersibility-imparting group deposited on the surfaces of the particles thereof so as to be capable of maintaining to be dispersed consistently without a dispersant, that is, a "self-dispersible" pigment (i.e., a surface-treated pigment), a pigment that is provided with a polymer covering the entire surfaces of the particles thereof so as to be capable of maintaining to be dispersed consistently without a dispersant, that is, an "encapsulated" pigment (i.e., a water-dispersible polymer-containing pigment), and a pigment dispersed with a dispersant may be used.

The pigment used in the present invention may be provided in the form of a dry powder or wet cake. The above pigments may be used alone or in combination of two or more.

The pigment used in the present invention is preferably a pigment having a particle size of 25 μm or less and is particularly preferably a pigment having a particle size of 1 μm or less. When the particle size of the pigment falls within the above range, the sedimentation of the pigment is reduced and the dispersibility of the pigment may be enhanced. The particle size of the pigment may be measured using, for example, a transmission electron microscope (TEM) or a scanning electron microscope (SEM).

(Polymer (A))

The polymer (A), which is used as a pigment dispersant in the present invention, is a polymer that has a solubility in water of 0.1 g/100 ml or less, is capable of forming microparticles in water when the degree of neutralization of the anionic group achieved by the basic compound is 100%, and has a number-average molecular weight of 1000 to 6000.

(Solubility in Water)

In the present invention, the solubility of the polymer (A) in water is determined as follows. Specifically, the sizes of the particles of the polymer are adjusted to fall within the range of 250 to 90 μm with sieves having openings of 250 and 90 μm. Then, 0.5 g of particles of the polymer are charged into a bag made of a 400-mesh gold net. The net is immersed in 50 ml of water and subsequently left to stand at 25° C. for 24 hours while stirring is performed slowly. After the net has been immersed in the water for 24 hours, the 400-mesh gold net in which the polymer is charged is dried for 2 hours in a dryer kept at 110° C. The change in the weight of the 400-mesh gold net containing the polymer which occurs while the net is immersed in the water is measured. Then, the solubility of the polymer is determined using the following formula.

Solubility (g/100 ml)=(400-mesh gold net containing polymer prior to immersion (g)−400-mesh gold net containing polymer subsequent to immersion (g))×2    [Math. 1]

(Microparticles)

In the present invention, whether or not the polymer (A) forms microparticles in water when the degree of neutralization of the anionic group achieved by the basic compound is 100% is determined by the following method.

(1) The acid value of the polymer is measured by Test methods for acid value based on JIS Test Method K 0070-1992. Specifically, 0.5 g of the polymer is dissolved in a tetrahydrofuran (hereinafter, may be referred to as "THF") solvent. The acid value of the polymer is determined by titration with a 0.1-M alcoholic potassium hydroxide solution using phenolphthalein as an indicator.

(2) To 50 ml of water, 1 g of the polymer is added. To the resulting mixture, a 0.1-mol/L aqueous potassium hydroxide solution is added in an amount required for neutralizing 100% of the acid value of the polymer in order to achieve a degree of neutralization of 100%.

(3) The resulting liquid having a degree of neutralization of 100% is irradiated with an ultrasonic wave for 2 hours at 25° C. in an ultrasonic cleaner (ultrasonic cleaner US-102 produced by SND Co., Ltd., 38 kHz self oscillation) and then left to stand for 24 hours at room temperature.

After the dispersion has been left to stand for 24 hours, part of the dispersion is sampled at a depth of 2 cm from the liquid surface. The sample liquid is subjected to a dynamic light-scattering particle size analyzer (dynamic light-scattering particle size analyzer "Microtrac particle counter UPA-ST150" produced by Nikkiso Co., Ltd.) to confirm the presence of microparticles by determining whether or not information relating to light scattering caused as a result of the formation of microparticles is obtained.

(Size of Particles of Microparticles)

If the microparticles formed of the polymer (A) used in the present invention have an excessively large size, the polymer (A) is likely to be unstable in water. Therefore, the size of particles of the polymer (A) is preferably not excessively large. Specifically, the size of particles of the polymer (A) is preferably 5 to 1,000 nm, is more preferably 7 to 700 nm, and is most preferably 10 to 500 nm. Although microparticles having a narrower size distribution are likely to have higher dispersibility, microparticles having a wide size distribution may also be used.

The measurements of particle size and particle size distribution are also conducted using the dynamic light-scattering particle size analyzer (dynamic light-scattering particle size analyzer "Microtrac particle counter UPA-ST150" produced by Nikkiso Co., Ltd.) as in the measurement of microparticles described above.

(Degree of Neutralization of Polymer (A))

The degree of neutralization of the polymer (A) used in the present invention is determined using the following formula.

Degree of Neutralization (%)=((Mass of basic compound (g)×56×1000)/ Acid value of polymer (A)(mgKOH/g)×Equivalent weight of basic compound×Mass of polymer (A)(g)))×100    [Math. 2]

The acid value of the polymer (A) is measured in accordance with JIS Test Method K 0070-1992. Specifically, 0.5 g of the sample is dissolved in a THF solvent. The acid value of the sample is determined by titration with a 0.1-M alcoholic potassium hydroxide solution using phenolphthalein as an indicator.

(Number-Average Molecular Weight of Polymer (A))

The polymer (A) used in the present invention has a number-average molecular weight of 1000 to 6000. Since the resin according to the present invention has a low solubility in water of 0.1 g/100 ml or less, a polymer (A) having an excessively large molecular weight may precipitate when dispersed in water even after neutralized with the basic compound. In addition, the permeability of the polymer to pigment aggregates may be degraded. This leads to the degradation of the capability of the polymer to crush the pigment aggregates and makes it difficult to readily disperse pigment particles.

On the other hand, if the number-average molecular weight of the polymer (A) is less than 1000, the stability of the aqueous pigment dispersion may be degraded.

Accordingly, the molecular weight of the polymer (A) used in the present application is preferably small. In particular, the number-average molecular weight of the polymer (A) is more preferably 1300 to 5000 and is most preferably 1500 to 4500.

In the present invention, a number-average molecular weight is determined by GPC (gel permeation chromatography) in terms of polystyrene equivalent weight. Specifically, a number-average molecular weight determined under the following conditions is used.

(Method for Determining Number-Average Molecular Weight (Mn))

The measurement of number-average molecular weight is conducted by gel permeation chromatography (GPC) under the following conditions.

Measurement apparatus: High-speed GPC system ("HLC-8220GPC" produced by Tosoh Corporation)

Columns: The following columns produced by Tosoh Corporation are used while being connected to one another in series.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)

Column temperature: 40° C.

Eluent: Tetrahydrofuran (THF)

Flow rate: 1.0 mL/min

Injection volume: 100 μL (THF solution containing a sample at a concentration of 0.4 mass %)

Reference materials: A calibration curve is prepared using the following standard polystyrenes.

(Standard Polystyrenes)

"TSKgel Standard Polystyrene A-500" produced by Tosoh Corporation

"TSKgel Standard Polystyrene A-1000" produced by Tosoh Corporation

"TSKgel Standard Polystyrene A-2500" produced by Tosoh Corporation

"TSKgel Standard Polystyrene A-5000" produced by Tosoh Corporation

"TSKgel Standard Polystyrene F-1" produced by Tosoh Corporation

"TSKgel Standard Polystyrene F-2" produced by Tosoh Corporation

"TSKgel Standard Polystyrene F-4" produced by Tosoh Corporation

"TSKgel Standard Polystyrene F-10" produced by Tosoh Corporation

"TSKgel Standard Polystyrene F-20" produced by Tosoh Corporation

"TSKgel Standard Polystyrene F-40" produced by Tosoh Corporation

"TSKgel Standard Polystyrene F-80" produced by Tosoh Corporation

"TSKgel Standard Polystyrene F-128" produced by Tosoh Corporation

"TSKgel Standard Polystyrene F-288" produced by Tosoh Corporation

"TSKgel Standard Polystyrene F-550" produced by Tosoh Corporation (Surface Tension)

The aqueous resin dispersion containing the polymer (A) used in the present invention may have a surface tension of about 70 dyn/cm, which is close to the surface tension of water. It is considered that, the higher the surface tension of the pigment dispersant, the higher the capability of maintaining the surface tension of the pigment dispersion to be equal to or higher than a predetermined level. In contrast, in the case where a polymer highly soluble in water and not capable of forming microparticles when the degree of neutralization of the anionic group achieved by the basic compound is 100% is used, an aqueous solution containing the polymer is likely to have a considerably low surface tension. In the present invention, the aqueous resin dispersion prepared using the polymer (A) preferably has a surface tension of 30 dyn/cm or more. It is more preferable that the polymer (A) have a surface tension of 40 dyn/cm or more. The surface tension refers to the surface tension of a resin solution prepared by, subsequent to the addition of 1 g of the polymer (A), adding a 0.1-mol/L aqueous potassium hydroxide solution to the polymer (A) in an amount required for neutralizing 100% of the acid value of the polymer in order to achieve a degree of neutralization of 100%.

The polymer (A) is not limited and may be any polymer that is, as described above, insoluble or poorly-soluble in water, which serves as a main medium of the pigment dispersion, before being neutralized, capable of forming microparticles after being completely neutralized, and has an anionic group that is a hydrophilic group and a hydrophobic group per molecule.

An example of such a polymer is a block polymer constituted by a polymer block including a hydrophobic group and a polymer block including an anionic group. Note that, even when such a block polymer is used, the advantageous effects of the present invention may fail to be achieved in the case where the block polymer has a solubility in water higher than 0.1 g/100 ml or the block polymer does not form microparticles when the degree of neutralization of the anionic group achieved by the basic compound is 100%.

As for the numbers of the hydrophobic groups and the anionic groups, if the number of the anionic groups is excessively large, the likelihood of the solubility of the polymer in water exceeding 0.1 g/100 ml or the polymer not forming microparticles when the degree of neutralization of the anionic group achieved by the basic compound is 100% may be increased. Accordingly, the number of the anionic groups is preferably not excessively large. The number of the anionic groups included in the polymer and the solubility of the polymer in water are not always determined by the acid value of the polymer or the number of anionic groups assumed in the design of the polymer; for example, even among polymers having the same acid value, polymers having a smaller molecular weight have a higher solubility in water, while polymers having a larger molecular weight have a lower solubility in water. Therefore, in the present invention, the polymer (A) is specified on the basis of solubility in water.

The polymer (A) may be a homopolymer, but is preferably a copolymer. The polymer (A) may be a random polymer, a block polymer, or an alternating polymer, but is particularly preferably a block polymer. The polymer (A) may be a branched polymer, but is preferably a linear polymer.

The polymer (A) is preferably a vinyl polymer in consideration of the degree of freedom of design. For producing a vinyl polymer having the molecular weight and the solubility that are desired in the present invention, "living polymerization", such as living radical polymerization, living cationic polymerization, or living anionic polymerization, is preferably used.

In particular, the polymer (A) is preferably a vinyl polymer produced using a (meth)acrylate monomer as a raw material. For producing such a vinyl polymer, living radical polymerization or living anionic polymerization is preferably used. In order to precisely design the molecular weight of the block polymer and the segments of the block polymer, living anionic polymerization is preferably used.

(Polymer (A) Produced by Living Anionic Polymerization)

A specific example of the polymer (A) produced by living anionic polymerization is the polymer represented by General Formula (1) below.

[Chem. 1]

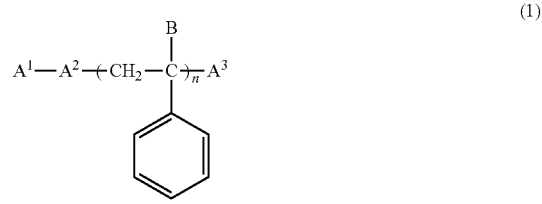

(1)

In Formula (1), $A^1$ represents an organolithium initiator residue; $A^2$ represents a polymer block including a monomer having an aromatic ring or a heterocyclic ring; $A^3$ represents a polymer block including an anionic group; n represents an integer of 1 to 5; and B represents an aromatic group or an alkyl group.

In General Formula (1), $A^1$ represents an organolithium initiator residue. Specific examples of the organolithium initiator include alkyllithium, such as methyllithium, ethyllithium, propyllithium, butyllithium (e.g., n-butyllithium, sec-butyllithium, iso-butyllithium, or tert-butyllithium), pentyllithium, hexyllithium, methoxymethyllithium, or ethoxymethyllithium; phenylalkylenelithium, such as benzyllithium, α-methylstyryllithium, 1,1-diphenyl-3-methylpentyllithium, 1,1-diphenylhexyllithium, or phenylethyllithium; alkenyllithium, such as vinyllithium, allyllithium, propenyllithium, or butenyllithium; alkynyllithium, such as ethynyllithium, butynyllithium, pentynyllithium, or hexynyllithium; aryllithium, such as phenyllithium or naphthyllithium; heterocyclic lithium, such as 2-thienyllithium, 4-pyridyllithium, or 2-quinolyllithium; and alkyl lithium-magnesium complex, such as tri(n-butyl) magnesium lithium or trimethyl magnesium lithium.

In the organolithium initiator, the cleavage of the bond between an organic group and lithium results in the formation of an active end on the organic group-side, on which polymerization begins. Thus, an organic group derived from organolithium is bonded to an end of a polymer produced using the organolithium initiator. In the present invention, the organic group derived from organolithium, which is bonded to an end of the polymer, is referred to as "organolithium initiator residue". For example, when a polymer is produced using methyllithium as an initiator, the organolithium initiator acid group is a methyl group. When a polymer is produced using butyllithium as an initiator, the organolithium initiator acid group is a butyl group.

In General Formula (1), $A^2$ represents a polymer block including a hydrophobic group. $A^2$ is a group that enables an adequate solubility to be achieved in a balanced manner, as described above, and is preferably a group capable of, when brought into contact with a pigment, readily adsorbing onto the pigment. Accordingly, $A^2$ is preferably a polymer block including a monomer having an aromatic ring or a heterocyclic ring.

The polymer block including a monomer having an aromatic ring or a heterocyclic ring is, specifically, a polymer block including a homopolymer or a copolymer produced by the homopolymerization or copolymerization of a monomer including an aromatic ring, such as a styrene monomer, or a monomer including a heterocyclic ring, such as a vinylpyridine monomer.

Examples of the monomer including an aromatic ring include styrene monomers, such as styrene, p-tert-butyldimethylsilyloxystyrene, o-methylstyrene, p-methylstyrene, p-tert-butylstyrene, p-tert-butoxystyrene, m-tert-butoxystyrene, p-tert-(1-ethoxymethyl)styrene, m-chlorostyrene, p-chlorostyrene, p-fluorostyrene, α-methylstyrene, and p-methyl-α-methylstyrene; vinylnaphthalene; and vinylanthracene.

Examples of the monomer including a heterocyclic ring include vinylpyridine monomers, such as 2-vinylpyridine and 4-vinylpyridine.

The above monomers may be used alone or in a mixture of two or more.

In General Formula (1), $A^3$ represents a polymer block including an anionic group. The polymer block $A^3$ is provided for achieving the adequate solubility described above and enhancing the dispersion stability in water when the pigment dispersion is formed.

Examples of the anionic group included in the polymer block $A^3$ include a carboxyl group, a sulfonate group, and a phosphate group. In particular, a carboxyl group is preferable, because of ease of preparation, a wide variety of monomer types, and ease of availability. The anionic group may be an acid anhydride group formed by two carboxyl groups being condensed by intramolecular or intermolecular dehydration.

The method for introducing the anionic group to the polymer block $A^3$ is not limited. For example, in the case where the anionic group is a carboxyl group, the polymer block $A^3$ may be a polymer block (PB1) including a homopolymer produced by the homopolymerization of (meth)acrylic acid or by a copolymer produced by the copolymerization of (meth)acrylic acid with another monomer or a polymer block (PB2) including a homopolymer produced by the homopolymerization of a (meth)acrylate including a protection group that can be regenerated into an anionic group by deprotection or by a copolymer produced by the copolymerization of such a (meth)acrylate with another monomer in which the protection group that can be regenerated into an anionic group by deprotection is partially or entirely regenerated into an anionic group.

Note that the term "(meth)acrylic acid" used in the polymer block $A^3$ collectively refers to acrylic acid and methacrylic acid, and the term "(meth)acrylate" used in the polymer block $A^3$ collectively refers to an acrylate and a methacrylate.

Specific examples of the (meth)acrylic acid and the (meth)acrylate include (meth)acrylic acid, methyl (meth)acrylate, ethyl (meth)acrylate, iso-propyl (meth)acrylate, allyl (meth)acrylate, n-butyl (meth)acrylate, iso-butyl (meth)acrylate, sec-butyl (meth)acrylate, tert-butyl (meth)acrylate, n-amyl (meth)acrylate, iso-amyl (meth)acrylate, n-hexyl (meth)acrylate, n-octyl (meth)acrylate, 2-ethylhexyl (meth)acrylate, n-lauryl (meth)acrylate, n-tridecyl (meth)acrylate, n-stearyl (meth)acrylate, phenyl (meth)acrylate, benzyl (meth)acrylate, cyclohexyl (meth)acrylate, 4-tert-butylcyclohexyl (meth)acrylate, isobornyl (meth)acrylate, tricyclodecanyl (meth)acrylate, dicyclopentadienyl (meth)acrylate, adamantyl (meth)acrylate, glycidyl (meth)acrylate, tetrahydrofurfuryl (meth)acrylate, 2-methoxyethyl (meth)acrylate, 2-ethoxyethyl (meth)acrylate, dimethylaminoethyl (meth)acrylate, diethylaminoethyl (meth)acrylate, trifluoroethyl (meth)acrylate, tetrafluoropropyl (meth)acrylate, pentafluoropropyl (meth)acrylate, octafluoropentyl (meth)acrylate, pentadecafluorooctyl (meth)acrylate, heptadecafluorodecyl (meth)acrylate, N,N-dimethyl (meth)acrylamide, (meth)acryloyl morpholine, (meth) acrylonitrile, and polyalkylene oxide group-containing (meth)acrylates, such as polyethylene glycol (meth)acrylate, polypropylene glycol (meth)acrylate, polyethylene glycol-polypropylene glycol (meth)acrylate, polyethylene glycol-polybutylene glycol (meth)acrylate, polypropylene glycol-polybutylene glycol (meth)acrylate, methoxypolyethylene glycol (meth)acrylate, ethoxypolyethylene glycol (meth)acrylate, but oxypolyethylene glycol (meth)acrylate, octoxypolyethylene glycol (meth)acrylate, lauroxypolyethylene glycol (meth)acrylate, stearoxypolyethylene glycol (meth)acrylate, phenoxypolyethylene glycol (meth)acrylate, methoxypolypropylene glycol (meth)acrylate, and octoxypolyethylene glycol-polypropylene glycol (meth)acrylate. The above monomers may be used alone or in a mixture of two or more.

In living anionic polymerization, when the monomer used is a monomer including a group having an active proton, such as an anionic group, a polymer may fail to be formed by living anionic polymerization, because an active end included in the polymer immediately reacts with the group having an active proton and becomes deactivated. Since it is difficult in living anionic polymerization to directly polymerize a monomer including a group having an active proton, it is preferable to perform polymerization while the group having an active proton is protected and to subsequently regenerate the protection group into a group having an active proton by deprotection.

For the above reasons, the polymer block $A^3$ is preferably a monomer including a (meth)acrylate that includes a protection group capable of being regenerated into an anionic group by deprotection. Using such a monomer prevents polymerization from being inhibited as described above. The anionic group protected with the protection group can be regenerated into an anionic group when deprotection is performed subsequent to the formation of the block polymer.

For example, in the case where the anionic group is a carboxyl group, the carboxyl group is esterified, and the esterified carboxyl group is regenerated into a carboxyl group by hydrolysis or the like to perform deprotection. The protection group capable of being converted into a carboxyl group is preferably a group including an ester linkage. Examples of such a group include primary alkoxycarbonyl groups, such as a methoxycarbonyl group, an ethoxycarbonyl group, an n-propoxycarbonyl group, and an n-butoxycarbonyl group; secondary alkoxycarbonyl groups, such as an isopropoxycarbonyl group and a sec-butoxycarbonyl group; tertiary alkoxycarbonyl groups, such as a t-butoxycarbonyl group; phenylalkoxycarbonyl groups, such as a benzyloxycarbonyl group; and alkoxyalkylcarbonyl groups, such as an ethoxyethylcarbonyl group.

Examples of monomers that can be used when the anionic group is a carboxyl group include alkyl (meth)acrylates, such as methyl (meth)acrylate, ethyl (meth)acrylate, n-propyl (meth)acrylate, isopropyl (meth)acrylate, n-butyl (meth)acrylate, sec-butyl (meth)acrylate, isobutyl (meth)acrylate, t-butyl (meth)acrylate, 2-ethylhexyl (meth)acrylate, decyl (meth)acrylate, undecyl (meth)acrylate, dodecyl (meth)acrylate (lauryl (meth)acrylate), tridecyl (meth)acrylate, pentadecyl (meth)acrylate, hexadecyl (meth)acrylate, heptadecyl (meth)acrylate, octadecyl (meth)acrylate (stearyl (meth)acrylate), nonadecyl (meth)acrylate, and icosanyl (meth)acrylate; phenylalkylene (meth)acrylates, such as benzyl (meth)acrylate; and alkoxyalkyl (meth)acrylates, such as ethoxyethyl (meth)acrylate. The above (meth)acrylates (c1) may be used alone or in combination of two or more. Among the above (meth)acrylates (c1), t-butyl (meth)acrylate or benzyl (meth)acrylate is preferably used in order to increase ease of the conversion to a carboxyl group. In consideration of ease of industrial availability, t-butyl (meth)acrylate is more preferable.

In General Formula (1), B represents an aromatic group or an alkyl group including 1 to 10 carbon atoms; and n represents an integer of 1 to 5.

In living anionic polymerization, when a (meth)acrylate monomer is directly polymerized with an active end included in a highly nucleophilic styrene polymer, polymerization may fail to be achieved because of nucleophilic attack to the carbonyl carbon. Therefore, when the polymer block $A^1$-$A^2$ is polymerized with a (meth)acrylate monomer, the nucleophilicity of the styrene monomer is adjusted using a reaction controlling agent prior to the polymerization with the (meth)acrylate monomer. The group B in General Formula (1) is derived from the reaction controlling agent. Specific examples of the reaction controlling agent include diphenylethylene, α-methylstyrene, and p-methyl-α-methylstyrene.

(Living Anionic Polymerization with Microreactor)

When the reaction conditions are set appropriately, living anionic polymerization may be performed in a batch process as in common free-radical polymerization. In living anionic polymerization, continuous polymerization may also be performed using a microreactor. In a microreactor, which is capable of readily mixing a polymerization initiator and a monomer, the reactions occur simultaneously at a uniform temperature, which enables a uniform polymerization rate to be achieved. This narrows the molecular-weight distribution of the polymer produced. Furthermore, it becomes easy to produce a block copolymer including components that are impervious to be mixed with each other since the growing ends are stable. Moreover, it is possible to readily control the reaction temperature. This makes it easy to reduce the occurrence of a secondary reaction.

A common method for performing living anionic polymerization with a microreactor is described below with reference to the FIGURE, which is a schematic diagram illustrating the microreactor.

A first monomer and a polymerization initiator used for initiating polymerization are introduced into a T-micromixer M1 (Reference Numeral 1 in the FIGURE) including channels in which a plurality of liquids can be mixed with one another, through tube reactors P1 and P2 (Reference Numerals 7 and 8 in the FIGURE), respectively. In the T-micromixer M1, the living anionic polymerization of the first monomer is performed to form a first polymer (Step 1).

The first polymer is transferred into a T-micromixer M2 (Reference Numeral 2 in the FIGURE). In the mixer M2, the growing end of the polymer is trapped with a reaction controlling agent introduced from a tube reactor P3 (Reference Numeral 9 in the FIGURE) in order to control the reaction (Step 2).

It is possible to control the number denoted by n in General Formula (1) by changing the type and amount of the reaction controlling agent used in this step.

The first polymer contained in the T-micromixer M2, which has been subjected to reaction control, is transferred into a T-micromixer M3 (Reference Numeral 3 in the FIGURE). In the mixer M3, the living anionic polymerization of a second monomer introduced from a tube reactor P4 with the first polymer, which has been subjected to reaction control, is continuously performed (Step 3).

Subsequently, the reaction is quenched using a compound including an active proton, such as methanol, to produce a block copolymer.

For producing the polymer (A) according to the present invention represented by General Formula (1) with the microreactor, a monomer including an aromatic ring or a heterocyclic ring is used as a first monomer, which is reacted with an initiator that is an organolithium initiator to form a polymer block including a monomer including the aromatic ring or heterocyclic ring, which is represented by $A^2$ (an organic group that is the organolithium initiator residue represented by $A^1$ is bonded to an end of the polymer block $A^2$).

After the reactivity of the growing end has been adjusted using the reaction controlling agent, the polymer block $A^2$ is reacted with the second monomer that is the monomer including a (meth)acrylate including a protection group capable of being regenerated into an anionic group to form another polymer block.

Subsequently, the protection group is regenerated into an anionic group by deprotection, such as hydrolysis. Thus, the polymer block $A^3$, that is, a polymer block including an anionic group, is formed.

A method for regenerating, into an anionic group, an ester linkage included in the protection group capable of being regenerated into an anionic group by deprotection reaction, such as hydrolysis, is described below in detail.

Although the hydrolysis of the ester linkage occurs under either an acidic or basic condition, the condition slightly varies depending on the group including the ester linkage. For example, when the group including the ester linkage is a primary alkoxycarbonyl group, such as a methoxycarbonyl group, or a secondary alkoxycarbonyl group, such as an isopropoxycarbonyl group, it is possible to produce a carboxyl group by performing hydrolysis under a basic condition. Examples of a basic compound used for creating the basic condition include metal hydroxides, such as sodium hydroxide and potassium hydroxide.

When the group including the ester linkage is a tertiary alkoxycarbonyl group, such as a t-butoxycarbonyl group, it is possible to produce a carboxyl group by performing hydrolysis under an acidic condition. Examples of an acidic compound used for creating the acidic condition include mineral acids, such as hydrochloric acid, sulfuric acid, and phosphoric acid; Bronsted acids, such as trifluoroacetic acid; and Lewis acids, such as trimethylsilyl triflate. An example of reaction conditions under which the hydrolysis of a t-butoxycarbonyl group is performed under an acidic condition is disclosed in "Jikken Kagaku Kouza (Lecture on Experimental Chemistry) 16, Synthesis of Organic Compounds IV", the fifth edition, edited by The Chemical Society of Japan.

Another example of the method for converting a t-butoxycarbonyl group into a carboxyl group is a method in which a cation-exchange resin is used instead of the above acids. Examples of the cation-exchange resin include resins including an acidic group, such as a carboxyl group (—COOH) or a sulfo group (—$SO_3H$), at a side chain of the polymer chain. In particular, a strongly acidic cation-exchange resin including a sulfo group at a side chain of the resin is preferably used in order to increase the reaction speed. Examples of commercial products of the cation-exchange resin which can be used in the present invention include a strongly acidic cation-exchange resin "Amberlite" produced by Organo Corporation. The amount of the cation-exchange resin used is preferably 5 to 200 parts by mass and is more preferably 10 to 100 parts by mass relative to 100 parts by mass of the polymer represented by General Formula (1) in order to perform hydrolysis with effect.

When the group including the ester linkage is a phenylalkoxycarbonyl group, such as a benzyloxycarbonyl group, it is possible to convert the group into a carboxyl group by hydrogenation reduction. Conducting the reaction at room temperature in the presence of a palladium catalyst, such as palladium acetate, by using a hydrogen gas as a reductant enables a quantitative regeneration of the phenylalkoxycarbonyl group into a carboxyl group.

As described above, the reaction conditions required for converting the group into a carboxyl group vary depending on the type of the group including the ester linkage. Therefore, for example, while a polymer produced by copolymerization using t-butyl (meth)acrylate and n-butyl (meth)acrylate as raw materials of the polymer block $A^3$ includes a t-butoxycarbonyl group and an n-butoxycarbonyl group, it is possible to perform the deprotection of only the t-butoxycarbonyl group into a carboxyl group by selectively hydrolyzing the t-butoxycarbonyl group, because the hydrolysis of the n-butoxycarbonyl group does not occur under an acidic condition, under which the hydrolysis of the t-butoxycarbonyl group occurs. That is, it is possible to adjust the acid value of the hydrophilic block ($A^3$) by appropriately selecting the monomer including a (meth)acrylate including a protection group capable of being regenerated into an anionic group, which is a raw material monomer of the polymer block $A^3$.

In the polymer (A) represented by General Formula (1), it is advantageous that the polymer blocks ($A^2$) and ($A^3$) be clearly separated from each other in order to enhance the stability of the aqueous pigment dispersion. The molar ratio $A^2:A^3$ between the polymer blocks ($A^2$) and ($A^3$) is preferably 100:10 to 100:500. If the proportion of the polymer block $A^3$ is less than 10 relative to 100 of the polymer block $A^2$, the dispersion stability of the pigment and the consistency in ink jet election may be degraded. On the other hand, if the proportion of the polymer block $A^3$ is more than 500 relative to 100 of the polymer block $A^2$, the hydrophilicity of the polymer may be excessively enhanced. In such a case, when a recording medium is a paper sheet or the like, the likelihood of the pigment permeating the recording medium may be increased, which degrades the color developability of the pigment. The ratio $A^2:A^3$ is particularly preferably 100:10 to 100:450.

In the polymer (A) represented by General Formula (1), the number of monomers including an aromatic ring or a heterocyclic ring, which constitutes the polymer block ($A^2$), is preferably 5 to 40, is more preferably 6 to 30, and is most preferably 7 to 25. The number of the anionic groups constituting the polymer block ($A^3$) is preferably 3 to 20, is more preferably 4 to 17, and is most preferably 5 to 15.

When the molar ratio $A^2:A^3$ of the polymer block ($A^2$) to the polymer block ($A^3$) is expressed by the ratio of the number of moles of the group including an aromatic ring or a heterocyclic ring constituting the polymer block ($A^2$) to the number of moles of the anionic group constituting the polymer block ($A^3$), the molar ratio $A^2:A^3$ is preferably 100:7.5 to 100:400.

The acid value of the polymer (A) represented by General Formula (1) is preferably 40 to 400 mgKOH/g, is more preferably 40 to 300 mgKOH/g, and is most preferably 40 to 190 mgKOH/g. If the acid value of the polymer (A) is less than 40 mgKOH/g, the dispersion stability of the pigment and the consistency in ink jet election may be degraded to an insufficient level. On the other hand, if the acid value of the polymer (A) exceeds 400 mgKOH/g, the hydrophilicity of the polymer is enhanced. This increases the amount of the pigment that permeates a recording medium and degrades the color developability of the pigment. If the acid value of the polymer (A) exceeds 190 mgKOH/g, the water-resistance of an ink produced using the polymer (A) may be degraded.

In the present invention, the acid value of a polymer is determined as in the measurement of the acid value of microparticles of the polymer (A) described above.

(Neutralizer: Basic Compound)

In the printing agent according to the present invention, the anionic group included in the polymer (A) is preferably neutralized.

Publicly known and commonly used basic compounds may be used for neutralizing the anionic group of the polymer (A). Examples of the basic compounds include inorganic basic substances, such as alkali-metal hydroxides (e.g., sodium hydroxide and potassium hydroxide), and organic basic compounds, such as ammonia, triethylamine, and alkanolamine.

In the present invention, the degree of neutralization of the polymer (A) included in the aqueous pigment dispersion is not necessarily 100% relative to the acid value of the polymer. Specifically, the degree of neutralization of the polymer (A) is preferably 20% to 200% and is more preferably 80% to 150%.

(Water)

In the present invention, pure water and ultrapure water, such as ion-exchange water, ultrafiltration water, reverse-osmosis water, and distilled water, may be used. Using water sterilized by ultraviolet irradiation or the addition of hydrogen peroxide suitably reduces the amount of fungus or bacteria generated while the printing agent is stored over a long period of time.

The water serves as a medium in which a pigment and a binder resin are dispersed in the preparation of the printing agent. In an aqueous printing agent, most of the medium is water, and a water-soluble solvent is typically added to the medium. In general, the ratio of water to the water-soluble solvent is, for example, 4:1 to 1:1.

(Organic Solvent)

In the present invention, various organic solvents included in inks for screen recording and water-based inks for ink-jet recording, which have been commonly used for printing, may be used. The organic solvents are roughly classified into two categories: those used as a humectant and those used as a permeation solvent.

Specific examples of the humectant include glycerin, an ethylene glycol adduct of glycerin (e.g., Liponic EG-1 (produced by Lipo Chemicals)), diglycerin, polyglycerin, ethylene glycol, propylene glycol, 1,3-propanediol, diethylene glycol, triethylene glycol, polyethylene glycol (e.g., "#200", "#300", "#400", "#4000", and "#6000" produced by Wako Pure Chemical Industries, Ltd.), 2-pyrrolidone, N-methyl-2-pyrrolidone, 1,3-dimethylimidazolinone, thiodiglycol, sulfolane, dimethyl sulfoxide, neopentyl alcohol, trimethylolpropane, and 2,2-dimethylpropanol. The above organic solvents may be used alone or in combination of two or more.

Specific examples of the permeation solvent include monovalent and polyvalent alcohols; amides; ketones; ketoalcohols; cyclic ethers; glycols; lower-alkyl ethers of polyhydric alcohols; polyalkylene glycols; polyols such as propylene glycol, dipropylene glycol, polypropylene glycol, 1,3-propanediol, 1,4-butanediol, 1,5-pentanediol, 1,6-hexanediol, 3-methyl-1,5-pentanediol, 1,2,6-hexanetriol, trimethylolpropane, and pentaerythritol; polyhydric alcohol alkyl ethers, such as diethylene glycol monobutyl ether, triethylene glycol monobutyl ether, tetraethylene glycol monomethyl ether, propylene glycol monomethyl ether, dipropylene glycol monomethyl ether, tripropylene glycol monomethyl ether, and propylene glycol monobutyl ether; polyhydric alcohol aryl ethers and polyhydric alcohol aralkyl ethers, such as ethylene glycol monophenyl ether and ethylene glycol monobenzyl ether; lactams, such as 2-pyrrolidone, N-methyl-2-pyrrolidone, and ε-caprolactam; 1,3-dimethylimidazolidinone acetone, ethyl acetate, N-methyl-2-pyrrolidone, m-butyrolactone, a polyoxyalkylene adduct of glycerin, methyl acetate, tetrahydrofuran, 1,4-dioxane, dioxolane, propylene glycol monomethyl ether acetate, dimethyl sulfoxide, diacetone alcohol, and dimethylformamide propylene glycol monomethyl ether. The above organic solvents may be used alone or in combination of two or more.

(Binder Resin)

In the present invention, various resins included in aqueous printing agents or aqueous inks for ink jet recording may be used as a binder resin. Examples of such resins include acrylic resins, urethane resins, styrene resins, styrene acrylic resins, styrene butadiene resins, vinyl chloride resins, polyolefin resins, vinyl acetate resins, and maleic resins. In particular, polyurethane resins and/or polyacrylic resins are preferable because they are easily available and enhance the fastness of a printed item. The above resins are preferably resins including a hydrophilic group, which are capable of readily dispersing in water used as a solvent of the printing agent. The binder resin may be used in any form, such as a form of water dispersion, in which the binder resin is present in water in a particle form, or in the form of a water-soluble resin, in which the binder resin is completely dissolved in water.

(Polyurethane Resin)

Examples of the polyurethane resin including a hydrophilic group include polyurethane resins including an anionic group, a cationic group, or a nonionic group. In particular, a polyurethane resin including an anionic group or a cationic group is preferable. A specific example of the polyurethane resin is a polyurethane resin constituted by one or more polyols selected from the group consisting of a polyether polyol, a polyester polyol, and a polycarbonate polyol, by a constitutional unit derived from a polyol including a hydrophilic group, such as an anionic group, a cationic group, a polyoxyethylene group, or a polyoxyethylene-polyoxypropylene group, and by a constitutional unit derived from a polyisocyanate. In consideration of fastness to rubbing, it is preferable to select the above polyol from a polyester polyol and a polycarbonate polyol.

In consideration of fastness to rubbing, the weight-average molecular weight of the urethane resin is preferably 5000 to 200000 and is more preferably 20000 to 100000.

Examples of the polyether polyol include a polyether polyol produced by the addition polymerization of a compound including two or more active hydrogen groups, such as ethylene glycol, diethylene glycol, triethylene glycol, propylene glycol, trimethylene glycol, 1,3-butanediol, 1,4-butanediol, 1,6-hexanediol, neopentyl glycol, glycerin, trimethylolethane, trimethylolpropane, sorbitol, cane sugar, aconitic sugar, femimelitic acid, phosphoric acid, ethylenediamine, diethylenetriamine, triisopropanolamine, pyrogallol, dihydroxybenzoic acid, hydroxyphthalic acid, or 1,2,3-propanetrithiol, with a cyclic ether compound, such as ethylene oxide, propylene oxide, butylene oxide, styrene oxide, epichlorohydrin, tetrahydrofuran, or cyclohexylene; and a polyether polyol produced by the ring-opening polymerization of the above cyclic ether compound with a cationic catalyst, a protonic acid, or a Lewis acid as a catalyst.

The above polyester polyol may be produced by the dehydration condensation of a diol compound, a dicarboxylic acid compound, or a hydroxycarboxylic acid compound; by the ring-opening polymerization of a cyclic ester compound, such as ε-caprolactone; or by the copolymerization of the polyesters produced by the above reactions. Examples of the diol compound used as a raw material for the polyester polyol include ethylene glycol, propylene glycol, 1,3-propanediol, 1,4-butanediol, 1,5-pentanediol, 3-methyl-1,5-pentanediol, 1,6-hexanediol, neopentyl glycol, diethylene glycol, triethylene glycol, tetraethylene glycol, polyethylene glycol, dipropylene glycol, tripropylene glycol, polypropylene glycol, bishydroxyethoxybenzene, 1,4-cyclohexanediol, 1,4-cyclohexanedimethanol, bisphenol A, hydrogenated bisphenol A, hydroquinone, and alkylene oxide adducts of the above diols.

Examples of the dicarboxylic acid compound used as a raw material for the polyester polyol include succinic acid, adipic acid, azelaic acid, sebacic acid, dodecanedicarboxylic acid, maleic acid, fumaric acid, 1,3-cyclopentanedicarboxylic acid, 1,4-cyclohexanedicarboxylic acid, terephthalic acid, isophthalic acid, phthalic acid, 1,4-naphthalenedicarboxylic acid, 2,5-naphthalenedicarboxylic acid, 2,6-naphthalenedicarboxylic acid, naphthalic acid, biphenyldicarboxylic acid, and 1,2bis(phenoxy)ethane-p,p'-dicarboxylic acid.

Examples of the hydroxycarboxylic acid compound used as a raw material of the polyester polyol include p-hydroxybenzoic acid and p-(2-hydroxyethoxy)benzoic acid.

The above polycarbonate polyol is preferably a polycarbonate polyol including, for example, a constitutional unit derived from a carbonic acid ester and a constitutional unit derived from a polyol. Such a polycarbonate polyol may be produced by a reaction in which, for example, a carbonic acid ester and a polyol, which is preferably an aliphatic diol, are used as raw materials.

Examples of the carbonic acid ester include methyl carbonate, dimethyl carbonate, ethyl carbonate, diethyl carbonate, cyclocarbonate, and diphenyl carbonate.

Examples of the polyol having a low molecular weight include aliphatic diols, such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7- heptanediol, 1,8-octanediol, 1,9-nonanediol, 1,10-decanediol, 1,11-undecanediol, 1,12-dodecanediol, 1,4-cyclohexanediol, and 1,4-cyclohexanedimethanol; aromatic diols, such as hydroquinone, resorcine, bisphenol A, bisphenol F, and 4,4'-biphenol; polyether polyols, such as polyethylene glycol, polypropylene glycol, and polyoxytetramethylene glycol; and polyester polyols, such as polyhexamethylene adipate, polyhexamethylene succinate, and polycaprolactone.

In particular, chain aliphatic diols having a relatively low molecular weight are preferably used. Examples of the preferable chain aliphatic diols include ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, and 1,12-dodecanediol. The number-average molecular weight of the diol is preferably 50 to 250.

The amount of the polycarbonate polyol used is preferably 80% to 99% by mass and is more preferably 85% to 99% by mass of the total mass of the polyols used for producing the polycarbonate urethane resin.

The amount of the polycarbonate polyol used is preferably 10% to 90% by mass of the total mass of the polyols and the polyisocyanate used for producing the polycarbonate urethane resin.

Examples of the anionic group include a carboxyl group, a carboxylate group, a sulfonic group, and a sulfonate group. In particular, a carboxylate group or a sulfonate group that is partially or entirely neutralized with a basic compound or the like is preferably used in order to maintain good dispersibility in water. Examples of the basic compound used for partially or entirely neutralizing the carboxyl group or the sulfonic group to form the anionic group include organic amines, such as ammonia, triethylamine, pyridine, and morpholine; alkanolamines, such as monoethanolamine; and metal basic compounds including Na, K, Li, or Ca. In particular, organic amines having a boiling point of 100° C. or less are preferably used in order to reduce the amount that remains in a dry coating film.

Examples of the cationic group include a tertiary amino group. Examples of an acid used for partially or entirely neutralizing the tertiary amino group include formic acid and acetic acid. Examples of an agent used for partially or entirely converting the tertiary amino group into a quaternary amino group include dialkyl sulfates, such as dimethyl sulfate and diethyl sulfate.

Examples of the nonionic group include polyoxyalkylene groups, such as a polyoxyethylene group, a polyoxypropylene group, a polyoxybutylene group, a poly(oxyethylene-oxypropylene) group, and a polyoxyethylene-polyoxypropylene group. In particular, a polyoxyalkylene group which includes an oxyethylene unit is preferably used in order to further enhance hydrophilicity.

Examples of the hydrophilic group-containing polyol include anionic group-containing polyols, cationic group-containing polyols, and nonionic group-containing polyols that are other than the polyols described above. In particular, an anionic group-containing polyol or a cationic group-containing polyol is preferably used. An anionic group-containing polyol is more preferably used.

Examples of the anionic group-containing polyol include a carboxyl group-containing polyol and a sulfonic group-containing polyol.

Examples of the carboxyl group-containing polyol include 2,2'-dimethylolpropionic acid, 2,2'-dimethylolbutanoic acid, 2,2'-dimethylolbutyric acid, 2,2'-dimethylolvaleric acid, and a carboxyl group-containing polyester polyol produced by reacting one of the above carboxyl group-containing polyols with a dicarboxylic acid. In particular, 2,2'-dimethylolpropionic acid is preferable.

Examples of the cationic group-containing polyol include tertiary amino group-containing polyols. Specific examples thereof include N-methyl-diethanolamine and a polyol produced by reacting a compound having two epoxy groups per molecule with a secondary amine.

Examples of the nonionic group-containing polyol include a polyalkylene glycol having a structural unit derived from ethylene oxide.

The amount of the hydrophilic group-containing polyol used is preferably 0.3% by mass to 15.0% by mass of the total amount of polyols used for producing the polyurethane resin.

When the content of the hydrophilic group in the entire polyurethane resin is 100 mmol/kg to 1200 mmol/kg, dispersibility in water is further enhanced. It is more preferable to set the content of the hydrophilic group in the entire polyurethane resin to be 150 mmol/kg to 1000 mmol/kg.

In the case where the hydrophilic group is an anionic group, the acid value of the anionic group is preferably 15 to 50 mgKOH/g and is more preferably 20 to 45 mgKOH/g. Note that the term "acid value" used herein refers to a theoretical acid value calculated on the basis of the amount of acidic group-containing compound, such as a carboxyl group-containing polyol, used for producing the polycarbonate urethane resin (A).

The above polyols may be used in combination with a polyol other than the one or more polyols selected from the group consisting of a polyether polyol, a polyester polyol, and a polycarbonate polyol or the above-described hydrophilic group-containing polyol, the other polyol not impairing the advantageous effects of the present invention.

Examples of the other polyol include polyols used as a raw material for the one or more polyols selected from the group consisting of a polyether polyol, a polyester polyol, and a polycarbonate polyol.

(Polyisocyanate)

Examples of the polyisocyanate capable of reacting with the above-described polyols include aromatic polyisocyanates, such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; aliphatic polyisocyanates, such as hexamethylene diisocyanate, lysine diisocyanate, xylylene diisocyanate, and tetramethylxylylene diisocyanate; and alicyclic structure-containing polyisocyanates, such as isophorone diisocyanate, cyclohexane diisocyanate, and dicyclohexylmethane diisocyanate.

The polyisocyanate is preferably an aliphatic polyisocyanate, such as hexamethylene diisocyanate, or an alicyclic structure-containing polyisocyanate, such as isophorone diisocyanate, in order to reduce the yellowing of a printed portion.

The amount of the polyisocyanate used is preferably 12% to 30% by mass of the total amount of the polyols and the polyisocyanate used for producing the polyurethane resin.

(Chain Extender)

The polyurethane resin may include a structural unit derived from a chain extender. Examples of the chain extender include polyamines and a compound including an active hydrogen atom.

Examples of the polyamines include diamines, such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine, N-hydroxymethylaminoethylamine, N-hydroxyethylaminoethylamine, N-hydroxypropylaminopropylamine, N-ethylaminoethylamine, N-methylaminopropylamine, diethylenetriamine, dipropylenetriamine, triethylenetetramine, hydrazine, N,N'-dimethylhydrazine, 1,6-hexamethylenebishydrazine, succinic acid dihydrazide, adipic acid dihydrazide, glutaric acid dihydrazide, sebacic acid dihydrazide, isophthalic acid dihydrazide, β-semicarbazide propionic acid hydrazide, 3-semicarbazide-propylcarbazinic acid ester, and semicarbazide-3-semicarbazidemethyl-3,5,5-trimethylcyclohexane.

The amount of the chain extender used is preferably 3 parts by mass or less, is more preferably 2.5% by mass or less, and is further preferably 0.5% by mass or less of the total amount of the polyols, the polyisocyanate, and the chain extender used for producing the polyurethane resin.

The crosslinking agent described below may optionally be used in order to further enhance the fastness to washing and rubbing of the printing agent according to the present invention. In the case where the crosslinking agent is used, the polyurethane resin preferably has a functional group capable of crosslinking with a functional group included in the crosslinking agent.

Examples of the functional group include a carboxyl group and a carboxylate group that serve as a hydrophilic group. The carboxyl group and the like enhance the dispersion stability of the polyurethane resin in an aqueous medium and, in the crosslinking reaction, also serve as the above functional group capable of partially crosslinking with the crosslinking agent.

In the case where the functional group is a carboxyl group or the like, the acid value of the polyurethane resin is preferably 2 to 55. It is preferable to use a polyurethane resin having an acid value of 15 to 50 in order to enhance fastness to washing and rubbing. Note that, the term "acid value" used herein refers to a theoretical acid value calculated on the basis of the amount of acidic group-containing compounds, such as the carboxyl group-containing polyol, used for producing the polyurethane resin.

An active hydrogen-containing compound capable of reacting with the polyisocyanate which does not impair the advantageous effects of the present invention may be used in the reaction.

The weight-average molecular weight of the polyurethane resin is preferably 5000 to 200000, is more preferably 20000 to 100000, and is further preferably 30000 to 70000 in consideration of fastness to washing and rubbing, feeling, and resolubility.

The polyurethane resin may be produced by, for example, reacting the polyols with the polyisocyanate without using a solvent or in the presence of an organic solvent. In the case where the polyurethane resin includes a hydrophilic group, the hydrophilic group is partially or entirely neutralized as needed, and the neutralized polyurethane resin is mixed with an aqueous medium to form an aqueous mixture. An emulsifier may be optionally used. In the case where the chain extender is used, mixing the chain extender with the aqueous medium when the aqueous mixture is formed enables a chain-extended polyurethane resin to be formed.

The ratio of the equivalent amount of an isocyanate group included in the polyisocyanate to the amount of a hydroxyl group included in the polyol in the reaction between the polyols and the polyisocyanate is preferably 0.8 to 2.5 and is more preferably 0.9 to 1.5.

Examples of the organic solvent used for producing the polyurethane resin include ketones, such as acetone and methyl ethyl ketone; ethers, such as tetrahydrofuran and dioxane; acetic acid esters, such as ethyl acetate and butyl acetate; nitriles, such as acetonitrile; and amides, such as dimethylformamide and N-methylpyrrolidone. The above organic solvents may be used alone or in combination of two or more.

Examples of the emulsifier include nonionic emulsifiers, such as polyoxyethylene nonylphenyl ether, polyoxyethylene lauryl ether, polyoxyethylene styryl phenyl ether, polyoxyethylene sorbitol tetraoleate, and a polyoxyethylene-polyoxypropylene copolymer; anionic emulsifiers, such as a fatty acid salt (e.g., sodium oleate), an alkyl sulfuric acid ester salt, an alkyl benzenesulfonic acid salt, an alkyl sulfosuccinic acid salt, a naphthalenesulfonic acid salt, a polyoxyethylene alkyl sulfate, an alkane sulfonate sodium salt, and an alkyl diphenyl ether sulfonic acid sodium salt; and cationic emulsifiers, such as an alkyl amine salt, an alkyl trimethyl ammonium salt, and an alkyl dimethyl benzyl ammonium salt.

Examples of the aqueous medium include water, organic solvents miscible with water, and a mixture of water and such an organic solvent. Examples of the organic solvents miscible with water include alcohols, such as methanol, ethanol, n-propanol, and iso-propanol; ketones, such as acetone and methyl ethyl ketone; polyalkylene glycols, such as ethylene glycol, diethylene glycol, and propylene glycol; alkyl ethers, such as polyalkylene glycol; and lactams, such as N-methyl-2-pyrrolidone. In the present invention, it is possible to use water alone as an aqueous medium. A mixture of water and an organic solvent miscible with water may also be used. An organic solvent miscible with water may also be used alone. In consideration of the safety and the environmental load, it is preferable to use water alone or a mixture of water and an organic solvent miscible with water. It is particularly preferable to use water alone.

In particular, the polyurethane resin is preferably a polycarbonate urethane resin. The polycarbonate urethane resin preferably has a rupture elongation of 300% or more in order to form a printed portion having excellent feeling.

The stretchability of a printed portion, that is, rupture elongation (i.e., the elongation of a coating film), is important for maintaining the fastness to washing and rubbing and the feeling of the printed portion when the printed portion is formed on a stretchable base material, such as a fabric, or a base material required to have high bending resistance, such as a leather. Using a polycarbonate urethane resin having a rupture elongation of 300% or more enables a printed portion stretchable with the stretching of the fabric to be formed. This reduces the rupture and cracking of the printed portion and enables the fastness to washing and rubbing of the printed portion and the feeling of the printed portion to be maintained. However, if the elongation of the polycarbonate urethane resin exceeds 2000%, the adhesion of a printed portion to a base material may be reduced, which leads to the degradation of the fastness to washing and rubbing of the printed portion.

In particular, the rupture elongation of the polycarbonate urethane resin is preferably 300% to 1000%, is more preferably 410% to 800%, and is most preferably 410% to 600%.

In the present invention, the measurement of rupture elongation is conducted as follows. A specimen having a rectangle shape with a length of 50 mm in a direction orthogonal to the principal contraction direction (i.e., the width direction of the film) and a length of 5 mm in the principal contraction direction (i.e., the longitudinal direction of the film) is taken. The specimen is subjected to a tensile test using a universal tensile testing machine (Autograph (registered trademark) produced by Shimadzu Corporation) at a testing speed of 300 mm/min with both ends (i.e., both ends in the longitudinal direction) of the specimen being held by the tensile testing machine. The elongation of the specimen at rupture is considered to be the rupture elongation of the specimen.

(Polyacrylic Resin)

An example of the polyacrylic resin including a hydrophilic group is, but not limited to, a polyacrylic resin including a constitutional unit derived from a (meth)acrylate and a constitutional unit derived from a monomer containing a hydrophilic group. The polyacrylic resin may further include, as a constitutional unit, a vinyl monomer capable of copolymerizing with a (meth)acrylate. Note that, the term "(meth)acrylic acid" used herein refers to one or both of methacrylic acid and acrylic acid; the term "(meth)acrylate" used herein refers to one or both of methacrylate and acrylate; and the term "(meth)acryloyl" used herein refers to one or both of methacryloyl and acryloyl.

Examples of the above polyacrylic resin include, but are not limited to, a (meth)acrylic acid-(meth)acrylic acid ester copolymer, a styrene-(meth)acrylic acid copolymer, a styrene-(meth)acrylic acid-(meth)acrylic acid ester copolymer, and a (meth)acrylic acid-acrylonitrile copolymer.

Examples of the (meth)acrylate and the vinyl monomer capable of copolymerizing with a (meth)acrylate include alkyl (meth)acrylates, such as methyl (meth)acrylate, ethyl (meth)acrylate, n-butyl (meth)acrylate, sec-butyl (meth) acrylate, t-butyl (meth)acrylate, isopropyl (meth)acrylate, and isobutyl (meth)acrylate; aromatic (meth)acrylates, such as benzyl (meth)acrylate; hydroxyl group-containing monomers, such as 2-hydroxyethyl (meth)acrylate and 2-hydroxypropyl (meth)acrylate; alkyl polyalkylene glycol mono (meth)acrylates, such as methoxy polyethylene glycol mono (meth)acrylate and methoxy polypropylene glycol mono (meth)acrylate; fluorine-containing (meth)acrylates, such as perfluoroalkylethyl (meth)acrylate; aromatic vinyl compounds, such as styrene, styrene derivatives (e.g., p-dimethylsilylstyrene, (p-vinylphenyl) methyl sulfide, p-hexynylstyrene, p-methoxystyrene, p-tert-butyldimethylsiloxystyrene, o-methylstyrene, p-methylstyrene, p-tert-butylstyrene, and α-methylstyrene), vinylnaphthalene, vinylanthracene, and 1,1-diphenylethylene; (meth)acrylate compounds, such as glycidyl (meth)acrylate, epoxy (meth)acrylate, ethylene glycol di(meth)acrylate, diethylene glycol di(meth)acrylate, trimethylolpropane tri(meth)acrylate, tetramethylene glycol tetra(meth)acrylate, 2-hydroxy-1,3-diacryloxypropane, 2,2-bis[4-(acryloxymethoxy)phenyl]propane, 2,2-bis[4-(acryloxyethoxy)phenyl]propane, dicyclopentenyl (meth)acrylate tricyclodecanyl (meth)acrylate, tris(acryloxyethyl) isocyanurate, and urethane (meth)acrylate; (meth)acrylates including an alkylamino group, such as dimethylaminoethyl (meth)acrylate, diethylaminoethyl (meth)acrylate, and dimethylaminopropyl (meth)acrylate; vinylpyridine compounds, such as 2-vinylpyridine, 4-vinylpyridine, and naphthylvinylpyridine; and conjugated dienes, such as 1,3-butadiene, 2-methyl-1,3-butadiene, 2,3-dimethyl-1,3-butadiene, 1,3-pentadiene, 1,3-hexadiene, and 1,3-cyclohexadiene. The above monomers may be used alone or in combination of two or more.

Examples of the monomer including a hydrophilic group include monomers including a carboxyl group, such as (meth)acrylic acid, itaconic acid, crotonic acid, fumaric acid, maleic anhydride, and citraconic acid; and monomers including an amide group, such as (meth)acrylamide, N,N-dimethylacrylamide, isopropylacrylamide, and diacetone acrylamide. The above hydrophilic groups may also improve the feeling of a printed item.

The polyacrylic resin used in the present invention is preferably produced by copolymerizing the above-described monomers with a monomer including a particular functional group in order to improve, e.g., the feeling of a printed item. Examples of the monomer including such a functional group include a monomer including an epoxy group, a monomer including a hydrolyzable silyl group, and a monomer including an amide group.

Examples of the monomer including an epoxy group include glycidyl (meth)acrylate and glycidyl allyl ether.

Examples of the monomer including a hydrolyzable silyl group include vinylsilane compounds, such as vinylmethyldimethoxysilane, vinyltrimethoxysilane, vinyltriethoxysilane, and vinyltris(2-methoxyethoxy)silane; and (meth)acryloyloxyalkylsilane compounds, such as 3-(meth) acryloyloxypropyltrimethoxysilane, 3-(meth) acryloyloxypropylmethyldimethoxysilane, 3-(meth) acryloyloxypropyltriethoxysilane, and 3-(meth) acryloyloxypropylmethyldiethoxysilane. The above monomers may be used alone or in combination of two or more.

The particles of the polyacrylic resin may be dispersed in water in any form. For example, forced emulsification may be performed with an emulsifier to form an emulsion. A dispersion including resin particles including a nonionic group or a neutralized ionic group may also be formed. In particular, it is preferable to form a dispersion by preparing a polyacrylic resin by copolymerizing a monomer including a carboxyl group, which is one of the above compounds used as raw materials for the polyacrylic resin, and neutralizing the polyacrylic resin with a basic compound. The basic compound described in Polyurethane Resin may be used for neutralizing the polyacrylic resin.

(Amount of Binder Resin Used)

In the present invention, the binder resin is used for fixing the pigment onto fibers. Using a large amount of binder resin enhances fastness, but makes the feeling of the fibers hard. Accordingly, the amount of binder resin used is preferably 20% by mass or less and is more preferably 10% by mass or less of the amount of printing agent.

As described above, fastness to washing and rubbing is affected by the molecular weight of the binder resin used. The higher the molecular weight of the urethane resin used, the higher the fastness to washing and rubbing. In the case where the binder resin is used for producing an ink for ink jet recording, it is preferable to determine the amount of binder resin used with consideration of the balance between viscosity and fastness, because adding an excessively large amount of urethane resin having a high molecular weight to the ink increases the viscosity of the ink to an excessive level. Therefore, the ratio between the amounts of the binder resin and pigment included in the printing agent may be the same as in the production of common inks for screen recording or ink jet recording. The ratio of the amount of binder resin to the amount of pigment included in the printing agent is, for example, preferably 1:3 to 15:1, is more preferably 1:1 to 10:1, and is most preferably 1:1 to 8:1.

(Method for Producing Printing Agent)

The printing agent according to the present invention is produced by forming a water dispersion containing the pigment at a high concentration (hereinafter, referred to as "aqueous pigment dispersion"), diluting the aqueous pigment dispersion with water, and adding the binder resin and, as needed, the other additives to the diluted pigment dispersion.

In the preparation of the aqueous pigment dispersion used in the present invention, it is preferable to disperse the pigment in a mixture of the polymer (A) and a water-soluble organic solvent before dispersing the pigment in water, which serves as a dispersion medium. Specifically, the polymer (A), a basic compound, and a pigment are sufficiently mixed with a stirring machine or dispersing device in the presence of a water-soluble organic solvent in order to make the pigment and the polymer (A) self-dispersible in water. The resulting dispersion mixture is mixed with water to form the aqueous pigment dispersion.

In the present invention, although the amounts of the raw materials used are not limited, it is preferable to use the following mixing proportions as a guide for determining the amounts of the raw materials used.

For example, the amount of polymer (A) used is preferably 5 to 200 parts by mass and is more preferably 5 to 100 parts by mass relative to 100 parts by mass of the pigment used.

The amount of water-soluble organic solvent used is preferably 20 to 200 parts by mass and is more preferably 30 to 200 parts by mass relative to 100 parts by mass of the pigment used.

The basic compound is preferably used, as described above, such that the degree of neutralization of the polymer (A) is 20% to 200% and is more preferably used such that the degree of neutralization of the polymer (A) is 80% to 150%. The degree of neutralization of the polymer (A) is determined using the following formula as described above.

Degree of Neutralization (%)=((Mass of basic compound (g)×56×1000)/(Acid value of polymer (A)(mgKOH/g)×Equivalent weight of basic compound×Mass of polymer (A)(g))) [Math. 3]

In the step in which a dispersion mixture containing the polymer (A) and a pigment is formed (hereinafter, referred to as "Step (1)"), a basic compound is used for neutralizing an anionic group included in the polymer (A). The basic compound may be selected from the above-described basic compounds.

Although the basic compound may be a 100%-pure product, it is preferable to use an aqueous solution of the basic compound because of the risk of heat generation or the like.

The water-soluble organic solvent used in this step is preferably a water-soluble organic solvent having a high boiling point in order to eliminate the need to, for example, the removal of the solvent in the subsequent steps. It is also preferable to use a water-soluble organic solvent that does not degrade the properties of an ink when the ink is used as a water-based ink for ink jet recording. A preferable example of such a water-soluble organic solvent is the water-soluble organic solvent having a high boiling point.

In Step (1), a certain small amount of water which does not impair the advantageous effects of the present invention may be used. However, it is preferable not to use a large amount of water, because the presence of a large amount of water in the initial stage of pigment dispersion may reduce the efficiency with which the pigment is dispersed with the polymer (A) and result in the formulation of clusters of only the polymer (A).

The dispersion method used in Step (1) is not limited and may be any publicly known dispersion method. Examples of the dispersion method include a media-mill dispersion method in which media are used, such as a paint shaker, a bead mill, a sand mill, or a ball mill; a medialess dispersion method in which a ultrasonic homogenizer, a high-pressure homogenizer, a Nanomizer, an Ultimaizer, or the like is used; and a knead dispersion method in which a strong shear force is applied using a roll mill, a Henschel mixer, a pressure kneader, an intensive mixer, a Banbury mixer, a planetary mixer, or the like. Among the above dispersions methods, a knead dispersion method is a method in which a strong shear force is applied to a high-solid-component-concentration mixture including a pigment with a kneader in order to reduce the size of the pigment particles and advantageously makes it possible to form an aqueous pigment dispersion having a high pigment concentration and effectively reduces the formation of coarse particles.

In the case where Step (1) is conducted by a knead dispersion method, the polymer (A), a basic compound, a water-soluble organic solvent, and a pigment are charged into a kneader, and the resulting mixture is kneaded. The order in which the above raw materials are charged into the kneader is not limited. The whole amounts of the raw materials may be charged into the kneader at a time, and the resulting mixture is kneaded. Alternatively, each of the raw materials may be charged into the kneader in small amounts. In another case, each of the raw materials may be used at different timing; for example, first, the polymer (A), a basic compound, and a pigment are charged into the kneader, and a water-soluble organic solvent is subsequently charged into the kneader. The amounts of the raw materials charged in the kneader are each set to fall within the above-described range.

It is preferable to knead the mixture while the solid content in the mixture is high in order to apply a strong shear force, which is one of the advantages of a knead dispersion method, to the mixture. This enables a larger shear force to be applied to the mixture.

The shear force applied to the pigment and the polymer (A) is preferably, for example, 180 MPa or more and is further preferably 1800 MPa or more, although it varies depending on the kneader used. The polymer (A) used in the present invention is capable of maintaining suitable dispersion even while a large shear force is applied to the polymer (A) and allows an aqueous pigment dispersion containing a reduced amount of coarse particles to be formed.

In order to increase the shear force applied, the proportion of solid components, such as the pigment and the polymer (A), is preferably 40% by mass or more and is more preferably 50% by mass or more.

The content of the pigment in the mixture is preferably increased to a maximum level in order to form an aqueous pigment dispersion containing a high concentration of the pigment. The content of the pigment in the mixture is, for example, preferably 35% by mass or more and is more preferably 40% by mass or more of the total amount of the mixture.

The ratio of the content of the pigment to the content of the polymer (A) is commonly, but not limited to, 10/0.5 to 10/20 and is more preferably 10/0.5 to 10/10.

The amount of water-soluble organic solvent used is preferably 1/5 or more by mass and is most preferably 1/3 or more by mass the amount of pigment used.

(Step 2: Dispersion in Water)

The dispersion mixture prepared in Step 1 is mixed with water (hereinafter, referred to as "Step (2)") in order to form an aqueous pigment dispersion containing the pigment and the polymer (A).

Although the dispersion mixture may be added to water, it is preferable to add an aqueous medium to the dispersion mixture in order to form an aqueous pigment dispersion containing particles having a uniform size.

Although the method for mixing water with the dispersion mixture is not limited, it is preferable to add water to the dispersion mixture in small amounts. This is because, if water is added to the dispersion mixture at a time and mixed with the dispersion mixture, a uniform aqueous pigment dispersion may fail to be formed. A dispersing machine is commonly used for forming the dispersion.

Publicly known dispersing machines may be used in Step 2. Examples of dispersing machines in which media are used include a paint shaker, a ball mill, an Attritor, a basket mill, a sand mill, a sand grinder, a DYNO-MILL, a DISPERMAT, an SC mill, a Spike Mill, and an agitator mill. Examples of dispersing machines in which media are not used include an ultrasonic homogenizer, a Nanomizer, a dissolver, a disper, and a high-speed impeller dispersing machine. Subsequent to the formation of the dispersion, the concentration of the dispersion may be adjusted as needed using a water-soluble solvent.

Depending on the type of the dispersing machine used or the like, prior to the formation of the aqueous dispersion using the dispersing machine, it is preferable to further add, as needed, the water-soluble organic solvent to the dispersion mixture in order to dilute the dispersion mixture such that the viscosity of the dispersion mixture is adjusted to be appropriate for the treatment using the dispersing machine (hereinafter, the dispersion mixture having the adjusted viscosity may be referred to as "viscosity-adjusted mixture"). For example, in the case where a sand mill is used, it is preferable to, before dispersion is performed with the sand mill, dilute the dispersion mixture such that the concentration of the solid components in the dispersion mixture is 10% to 40% by mass and the viscosity of the dispersion mixture is several tens of centipoises to several hundred centipoises.

Subsequent to the formation of the aqueous dispersion in Step 2, a step in which centrifugal separation or filtration is performed may optionally be conducted.

In the present application, an aqueous pigment dispersion in which water serves as a medium is formed in Step 2 by phase-inversion emulsification or a mechanism analogous thereto.

Conducting Steps (1) and (2) according to the present application enables the formation of an aqueous pigment dispersion containing a reduced amount of coarse particles.

It is considered that the aqueous pigment dispersion prepared in the above-described manner is stable since the pigment particles are included in or partially adsorbed on particles of the polymer (A).

Since the coarse particles may degrade image properties, it is preferable to remove the coarse particles by centrifugal separation, filtration, or the like prior to or subsequent to the preparation of the ink.

Subsequent to the dispersion step, a step in which impurities are removed by an ion-exchange treatment or an ultrafiltration treatment may optionally be conducted. A post treatment may also be performed subsequently. It is possible to remove ionic substances, such as cations and anions (e.g., divalent metal ions), by the ion-exchange treatment. It is possible to remove, by the ultrafiltration treatment, dissolved impurities (e.g., a residue of the synthesis of the pigment, an excess component of the dispersion composition, a resin that is not adsorbed on the organic pigment, and foreign matter). Publicly known ion-exchange resins may be used in the ion-exchange treatment. Publicly known ultrafiltration membranes may be used in the ultrafiltration treatment. Both normal ultrafiltration membranes and double-capacity ultrafiltration membranes may be used.

Subsequent to the preparation of the aqueous pigment dispersion, the aqueous pigment dispersion is mixed with a diluent solvent, such as water, the binder resin, and, as needed, other additives for printing agents in order to produce a printing agent compatible with a printing method, such as dip dyeing or printing, suitable for the fibers that are to be colored.

Examples of an additive for printing agents which can be added to a printing agent for screen recording include a preservative, a viscosity modifier, a pH adjuster, a chelating agent, an antioxidant, an ultraviolet absorber, a flame retardant, and a crosslinking agent. The final pigment concentration is preferably 1% to 10% by mass. In such a case, the above additives are preferably used together with the above binder resin.

A printing agent for dip dyeing may include, as additives for printing agents, a preservative, a viscosity modifier, a pH adjuster, a chelating agent, an antioxidant, an ultraviolet absorber, a flame retardant, and a crosslinking agent and includes the binder resin. The final pigment concentration in the printing agent is preferably 1% to 10% by mass. The viscosity of the printing agent is adjusted to be 1 mPa·s to 100 mPa·s appropriately depending on the device used. An aqueous pigment composition for spray printing may include, as additives, a viscosity modifier, a pH adjuster, a chelating agent, a plasticizer, an antioxidant, and an ultraviolet absorber and includes the binder resin. The final pigment concentration in the pigment composition is preferably 1% to 10% by mass. The viscosity of the pigment composition is adjusted to be 1 mPa·s to 100 mPa·s appropriately depending on the device used.

A printing agent for ink jet recording may include, as additives for printing agents, a preservative, a viscosity modifier, a pH adjuster, a chelating agent, an antioxidant, an ultraviolet absorber, a flame retardant, and a crosslinking agent. The final pigment concentration in the printing agent is preferably 1% to 20% by mass in order to meet the necessity to achieve a sufficient image density and enhance the dispersion stability of the pigment in the ink. In such a case, the additives are preferably used together with the binder resin.

Specific examples of the preservative and a fungicide include sodium benzoate, pentachlorophenol sodium, 2-pyridinethiol-1-oxide sodium, sodium sorbate, sodium dehydroacetate, and 1,2-dibenzisothiazolin-3-one (e.g., PROXEL GXL, PROXEL XL-2, PROXEL LV, PROXEL AQ, PROXEL BD20, and PROXEL DL produced by Arch Chemical, Inc.).

Specific examples of the viscosity modifier include naturally-occurring and synthetic polymers that are principally soluble in water, such as carboxymethyl cellulose, sodium polyacrylate, polyvinylpyrrolidone, gum arabic, and starch.

Specific examples of the pH adjuster include collidine, imidazole, phosphoric acid, 3-(N-morpholino)propanesulfonic acid, tris(hydroxymethyl)aminomethane, and boric acid.

Specific examples of the chelating agent include ethylenediaminetetraacetic acid, ethylenediaminediacetic acid, nitrilotriacetic acid, 1,3-propanediaminetetraacetic acid, diethylenetriaminepentaacetic acid, N-hydroxyethylethylenediaminetriacetic acid, iminodiacetic acid, uramildiacetic acid, 1,2-diaminocyclohexane-N,N,N',N'-tetraacetic acid, malonic acid, succinic acid, glutaric acid, maleic acid, and salts of the above acids (including hydrates).

Specific examples of the antioxidant and the ultraviolet absorber include allophanates, such as allophanate and methyl allophanate; biurets, such as biuret, dimethyl biuret, and tetramethyl biuret; L-ascorbic acid and salts thereof; Tinuvin 328, 900, 1130, 384, 292, 123, 144, 622, 770, and 292, Irgacor 252 and 153, Irganox 1010, 1076, and 1035, and MD 1024 produced by Ciba-Geigy; and lanthanide oxides.

The methods for performing dilution and adding the above additives are not limited; common methods may be employed. For example, the aqueous pigment dispersion is mixed with the binder resin, additives such as the surfactant, the viscosity modifier, the antifoaming agent, the antioxidant or the ultraviolet absorber, and the preservative, and the diluent solvent corresponding to the desired dilution rate, and the resulting mixture is dispersed with a dispersing machine or a stirring machine, such as a bead mill, a ball mill, a sand mill, an Attritor, a roll mill, an agitator, a Henschel mixer, a colloid mill, an ultrasonic homogenizer, an ultrahigh-pressure homogenizer, or a pearl mill. Optionally, the additives may be further added to the resulting dispersion as needed.

In the case where the printing agent according to the present invention is used in ink jet recording, the surface tension of the printing agent is preferably adjusted to be 20 mN/m or more and 60 mN/m or less, is more preferably adjusted to be 20 mN or more and 45 mN/m or less, and is further preferably adjusted to be 20 mN/m or more and 40 mN/m or less. If the surface tension of the printing agent is less than 20 mN/m, the liquid may spill over onto the nozzle surface, which avoids normal printing. If the surface tension of the printing agent exceeds 60 mN/m, the printing agent is likely to be rejected by a nonabsorbable base material. The viscosity of the printing agent is preferably 1.2 mPa·s or more and 20.0 mPa·s or less, is more preferably 2.0 mPa·s or more and less than 15.0 mPa·s, and is further preferably 3.0 mPa·s or more and less than 12.0 mPa·s. When the viscosity of the printing agent falls within the above range, an excellent ink-ejection property may be achieved. Furthermore, the excellent ink-ejection property may be maintained over a prolonged period of time. The surface tension of the printing agent can be adjusted appropriately by using the surfactant.

In the case where the binder resin includes a crosslinkable functional group, a crosslinking agent including two or more reactive groups may be used as an additive. Examples of the crosslinking agent include amino resins, such as a melamine resin, a benzoguanamine resin, and a urea resin; phenolic resins, such as trimethylol phenol and condensation products thereof; polyisocyanates, such as tetramethylene diisocyanate, diphenylmethane diisocyanate, hexamethylene diisocyanate, naphthalene diisocyanate, isophorone diisocyanate, xylylene diisocyanate, and modified isocyanates and block isocyanates derived from the above isocyanates; amines, such as aliphatic amines, aromatic amines, N-methylpiperazine, triethanolamine, morpholine, dialkylaminoethanol, and benzyldimethylamine; polycarboxylic acids; acid anhydrides, such as phthalic anhydride, maleic anhydride, hexahydrophthalic anhydride, pyromellitic anhydride, benzophenonetetracarboxylic anhydride, and ethylene glycol bistrimellitate; epoxy compounds, such as a bisphenol-A epoxy resin, a phenolic epoxy resin, a glycidyl methacrylate copolymer, a carboxylic acid glycidyl ester resin, and alicyclic epoxy; and alcohols, such as polyether polyol, polybutadiene glycol, polycaprolactone polyol, and trishydroxyethyl isocyanate.

The amount of crosslinking agent added to the printing agent according to the present invention needs to be determined so as to be commensurate with the number of crosslinkable functional groups included in the binder resin. The content of crosslinking agent is preferably 20% by mass or less, is more preferably 10% by mass or less, and is further preferably 7% by mass or less. Adding an excessively large amount of crosslinking agent to the printing agent makes the feeling of the fibers hard, while adding an excessively small amount of crosslinking agent to the printing agent may degrade fastness.

(Item on Which Printing Agent is Applied)

The printing agent according to the present invention may be applied to a fabric, artificial leather, natural leather, or the like by printing. It is particularly suitable to apply the printing agent to a fabric by printing.

The fabric used in the present invention is preferably a medium composed of fibers and may be either a woven fabric or a nonwoven fabric. Fabrics composed of natural or synthetic fibers, such as cotton, silk, wool, hemp, nylon, polyester, polyurethane, or rayon, may be used.

EXAMPLES

The advantageous effects of the present invention are described specifically with reference to Examples and Comparative examples below. However, the present invention is not limited by Examples below. Note that, in the following description, all "part" and "%" are on a mass basis.

Synthesis Examples of Polymer (A)

Synthesis Example 1 n-Butyllithium (BuLi) used as a polymerization initiator and styrene (St) used as a first monomer were introduced into the T-micromixer M1 illustrated in the FIGURE from the tube reactors P1 and P2 illustrated in the FIGURE, respectively, and reacted with each other by living anionic polymerization to form a polymer.

The polymer was transferred into the T-micromixer M2 illustrated in the FIGURE through the tube reactor R1 illustrated in the FIGURE. Subsequently, the growing ends of the polymer were trapped with a reaction controlling agent (i.e., 1,1-diphenylethylene (DPE)) introduced from the tube reactor P3 illustrated in the FIGURE.

Then, methacrylic acid tert-butyl ester (t-BMA) used as a second monomer was introduced into the T-micromixer M3 from the tube reactor P4 illustrated in the FIGURE and reacted with the polymer transferred through the tube reactor R2 illustrated in the FIGURE by continuous living anionic polymerization. Subsequently, the reaction was quenched with methanol. Hereby, a block copolymer (PA-1) was produced.

In the above reaction, the reaction temperature was set to 24° C. by burying the entire microreactor in a thermostat. The monomers and the reaction controlling agent introduced into the microreactor were used in the form of a tetrahydrofuran (THF) solution. As a BuLi source, a commercial 2.6-M hexane solution was used. The hexane solution was diluted by hexane. By changing the concentration of BuLi in the diluted solution and the rate at which BuLi was introduced into the T-micromixer M1, the molar ratio between the components of the block copolymer (PA-1) was adjusted as described below.

Molar Ratio Between Components of Block Copolymer (PA-1)

Polymerization Initiator/First Monomer/Reaction Controlling Agent/Second Monomer=1.0/13.5/1.0/7.5

The block copolymer (PA-1) was then treated with a cation-exchange resin in order to regenerate the t-butoxycarbonyl group included in the t-BMA block into a carboxyl group by hydrolysis. Subsequently, the reaction solution was distilled under a reduced pressure to obtain a solid, which was pulverized to form a powder of a polymer (P-1), which was used as the polymer W.

Table 1 shows the number-average molecular weight of the polymer (A), the acid value of the polymer (A), and the solubility of the polymer (A) in water, the presence of microparticles in the polymer (A) when the degree of neutralization was 100% and the average particle size (nm) of the microparticles, and the surface tension (dyn/cm) of the polymer (A).

Synthesis Example 2

BuLi used as a polymerization initiator and St used as a first monomer were introduced into the T-micromixer M1 illustrated in the FIGURE from the tube reactors P1 and P2 illustrated in the FIGURE, respectively, and reacted with each other by living anionic polymerization to form a polymer.

The polymer was transferred into the T-micromixer M2 illustrated in the FIGURE through the tube reactor R1 illustrated in the FIGURE. Subsequently, the growing ends of the polymer were trapped with a reaction controlling agent (i.e., α-methylstyrene (α-MeSt)) introduced from the tube reactor P3 illustrated in the FIGURE.

Then, t-BMA used as a second monomer was introduced into the T-micromixer M3 from the tube reactor P4 illustrated in the FIGURE and reacted with the polymer transferred through the tube reactor R2 illustrated in the FIGURE by continuous living anionic polymerization. Subsequently, the reaction was quenched with methanol. Hereby, a block copolymer (PA-2) was produced.

In the above reaction, the reaction temperature was set to 24° C. by burying the entire microreactor in a thermostat. The monomers and the reaction controlling agent introduced into the microreactor were used in the form of a THF solution. As a BuLi source, a commercial 2.6-M hexane solution was used. The hexane solution was diluted by hexane. By changing the concentration of BuLi in the diluted solution and the rate at which BuLi was introduced into the T-micromixer M1, the molar ratio between the components of the block copolymer (PA-2) was adjusted as described below.

Molar Ratio Between Components of Block Copolymer (PA-2)

Polymerization Initiator/First Monomer/Reaction Controlling Agent/Second Monomer=1.0/12.0/1.3/8.1

The block copolymer (PA-2) was then treated with a cation-exchange resin in order to perform hydrolysis. Subsequently, the reaction solution was distilled under a reduced pressure to obtain a solid, which was pulverized to form a powder of a polymer (P-2).

Synthesis Example 3

A polymer (P-3) was produced as in Synthesis example 1, except that the types of monomers used, the amount of monomers used, and the like were changed.

Comparative Synthesis Example 1

Synthesis Example of Comparative Polymer (PH-1)

(Method for Preparing Random Polymer)

Into a reaction container equipped with a stirrer, a dropper, and a reflux device, 100 parts of methyl ethyl ketone was charged. While stirring was performed, the inside of the reaction container was purged with nitrogen. After heating had been performed while the inside of the reaction container was maintained to be a nitrogen atmosphere in order to cause methyl ethyl ketone to reflux, a liquid mixture containing 74 parts of St, 11 parts of acrylic acid, 15 parts of methacrylic acid, and 8 parts of a polymerization initiator ("V-75" produced by Wako Pure Chemical Industries, Ltd.) was added dropwise to the reaction container through the dropper over 2 hours. The temperature of the reaction system was maintained to be 80° C. at some midpoint of the addition of the liquid mixture.

After the addition of the liquid mixture had been completed, the reaction was continued another 25 hours at 80° C. At some midpoint of the reaction, the polymerization initiator was further added appropriately in accordance with the amounts of raw materials consumed. After the reaction had been completed, methyl ethyl ketone was distilled away under a reduced pressure, and the resulting solid was pulverized to form a powder of a polymer (PH-1).

The polymer (PH-1) had a number-average molecular weight of 5255, a weight-average molecular weight of 9000, and an acid value of 185 mgKOH/g.

(Method for Determining Physical Properties of Polymer)

The physical properties of each of the polymers (A) prepared above were determined by the following methods.

(Method for Measuring Number-Average Molecular Weight (Mn) and Weight-Average Molecular Weight (Mw))

The measurement of Mn and Mw was conducted by gel permeation chromatography (GPC) under the conditions below.

Measurement apparatus: High-speed GPC system ("HLC-8220GPC" produced by Tosoh Corporation)

Columns: The following columns produced by Tosoh Corporation were used while being connected to one another in series.

"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1

Detector: RI (differential refractometer)
Column temperature: 40° C.
Eluent: Tetrahydrofuran (THF)
Flow rate: 1.0 mL/min
Injection volume: 100 μL (THF solution containing a sample at a concentration of 0.4 mass %)

Reference materials: A calibration curve was prepared using the following standard polystyrenes.

(Standard Polystyrenes)

"TSKgel Standard Polystyrene A-500" produced by Tosoh Corporation
"TSKgel Standard Polystyrene A-1000" produced by Tosoh Corporation "TSKgel Standard Polystyrene A-2500" produced by Tosoh Corporation
"TSKgel Standard Polystyrene A-5000" produced by Tosoh Corporation
"TSKgel Standard Polystyrene F-1" produced by Tosoh Corporation
"TSKgel Standard Polystyrene F-2" produced by Tosoh Corporation
"TSKgel Standard Polystyrene F-4" produced by Tosoh Corporation
"TSKgel Standard Polystyrene F-10" produced by Tosoh Corporation
"TSKgel Standard Polystyrene F-20" produced by Tosoh Corporation
"TSKgel Standard Polystyrene F-40" produced by Tosoh Corporation
"TSKgel Standard Polystyrene F-80" produced by Tosoh Corporation
"TSKgel Standard Polystyrene F-128" produced by Tosoh Corporation
"TSKgel Standard Polystyrene F-288" produced by Tosoh Corporation
"TSKgel Standard Polystyrene F-550" produced by Tosoh Corporation (Method for Measuring Acid Value)

The measurement of acid value was conducted in accordance with JIS Test Method K 0070-1992. Specifically, 0.5 g of the sample was dissolved in a THF solvent. The acid value of the sample was determined by titration with a 0.1-M alcoholic potassium hydroxide solution using phenolphthalein as an indicator.

(Method for Measuring Solubility in Water)

The sizes of the particles of the polymer were adjusted to fall within the range of 250 to 90 μm with sieves having openings of 250 and 90 μm. Then, 0.5 g of particles of the polymer were charged into a bag made of a 400-mesh gold net. The net was immersed in 50 ml of water and subsequently left to stand at 25° C. for 24 hours while stirring was performed slowly. After the net had been immersed in the water for 24 hours, the 400-mesh gold net in which the polymer was charged was dried for 2 hours in a dryer kept at 110° C. The change in the weight of the 400-mesh gold net containing the polymer which occurred while the net was immersed in the water was measured. Then, the solubility of the polymer was determined using the following formula.

$$\text{Solubility (g/100 ml)} = (\text{400-mesh gold net containing polymer prior to immersion (g)} - \text{400-mesh gold net containing polymer subsequent to immersion (g)}) \times 2 \quad \text{[Math. 4]}$$

(Method for Determining Formation of Microparticles in Water and Method for Measuring Average Particle Size (nm))

(1) The acid value of the polymer was measured by the above-described method for measuring acid value.

(2) To 50 ml of water, 1 g of the polymer was added. To the resulting mixture, a 0.1-mol/L aqueous potassium hydroxide solution was added in an amount required for neutralizing 100% of the acid value of the polymer determined in (1) above in order to achieve a degree of neutralization of 100%.

(3) The resulting liquid having a degree of neutralization of 100% was irradiated with an ultrasonic wave for 2 hours at 25° C. in an ultrasonic cleaner (ultrasonic cleaner US-102 produced by SND Co., Ltd., 38 kHz self oscillation) in order to perform dispersion and then left to stand for 24 hours at room temperature.

After the dispersion had been left to stand for 24 hours, part of the dispersion was sampled at a depth of 2 cm from the liquid surface. The sample liquid was subjected to a dynamic light-scattering particle size analyzer (dynamic light-scattering particle size analyzer "Microtrac particle counter UPA-ST150" produced by Nikkiso Co., Ltd.) to confirm the presence of microparticles by determining whether or not information relating to light scattering caused as a result of the formation of microparticles was obtained.

The average size of the microparticles was also measured.

(Method for Measuring Surface Tension)

The measurement of surface tension was conducted by subjecting, to a Wilhelmy surface tensiometer, a sample liquid prepared as in the preparation of the above-described sample liquid used for determining the formation of microparticles in water.

Tables 1 and 2 show the raw materials for the polymers prepared in Synthesis examples and Comparative synthesis examples, the reaction conditions under which each of the polymers was prepared, and the physical properties of each of the polymers.

TABLE 1

|  |  | Synthesis example 1 | Synthesis example 2 | Synthesis example 3 |
|---|---|---|---|---|
| Polymer (A) |  | P-1 | P-2 | P-3 |
| Reaction temperature |  | 24° C. | 24° C. | 24° C. |
| Initiator | Type | BuLi | BuLi | BuLi |
|  | molar ratio | 1.0 | 1.0 | 1.0 |
| First monomer | Type | St | St | St |
|  | molar ratio | 13.3 | 12.0 | 9.0 |
| Reaction controlling agent | Type | DPE | α-MeSt | DPE |
|  | molar ratio | 1.0 | 1.3 | 1.0 |
| Second monomer | Type | tBMA | tBMA | tBMA |
|  | molar ratio | 8.1 | 8.1 | 13.0 |
| Molar ratio of first monomer to second monomer | $A^2:A^3=$ | 100:61 | 100:68 | 100:144 |
| Molecular weight (number-average molecular weight) |  | 2317 | 2382 | 2396 |
| Acid value | mgKOH/g | 145 | 145 | 193 |
| Solubility in water (g/100 ml) |  | 0.0034 | 0.0084 | 0.0270 |
| Presence of microparticles when degree of neutralization was 100%/average particle size (nm) |  | Yes/344 | Yes/82 | Yes/13 |
| Surface tension (dyn/cm) |  | 66.6 | 66.2 | 37.5 |

TABLE 2

|  | PH-1 |
|---|---|
| Molecular weight (number-average molecular weight) | 5255 |
| Acid value mgKOH/g | 185 |
| Solubility in water (g/100 ml) | 0.031 |
| Presence of microparticles when degree of neutralization was 100%/average particle size (nm) | No |
| Surface tension (dyn/cm) | 45.0 |
| Water contact angle (°) | 49.6 |

In Tables 1 and 2,
BuLi represents n-butyllithium;
St represents styrene;
DPE represents 1,1-diphenylethylene;
αMeSt represents α-methylstyrene;
tBMA represents methacrylic acid tert-butyl ester; and
nBMA represents methacrylic acid n-butyl ester.

(Method for Producing Aqueous Pigment Dispersion)
(Method for Producing Aqueous Pigment Dispersion with Intensive Mixer)

Into a 1.0-liter intensive mixer (Nippon Eirich Co., Ltd.), 150 parts of a pigment that was a phthalocyanine pigment FASTOGEN Blue Pigment (produced by DIC corporation, C.I. Pigment 15:3), 45 parts of the polymer (A) that was the polymer (P-1), 95 parts of triethylene glycol used as a water-soluble solvent, and 19 parts of a 34% aqueous potassium hydroxide solution were charged. The resulting mixture was kneaded for 25 minutes at a rotor peripheral speed of 2.94 m/s and a pan peripheral speed of 1 m/s (Step 1).

To the kneaded mixture in the container of the intensive mixer, 450 parts of ion-exchange water was gradually added while stirring was continued. Subsequently, a liquid mixture of 55 parts of triethylene glycol used as a water-soluble solvent and 186 parts of ion-exchange water was added to the mixture (Step 2). Hereby, an aqueous pigment dispersion having a pigment concentration of 15.0% was formed.

(Production Examples: Method for Producing Aqueous Pigment Dispersion)

Aqueous pigment dispersions were prepared as described above, except that the type of the polymer (A), type of the pigment used, and the like were changed as shown in Tables 3 and 4 below.

TABLE 3

| | Aqueous pigment dispersion | | | | | |
|---|---|---|---|---|---|---|
| | Production example 1 | Production example 2 | Production example 3 | Production example 4 | Production example 5 | Production example 6 |
| Type of pigment | PB.15:3 | PB.15:3 | PB.15:3 | PR122 | PY74 | PB7 |
| Amount of pigment (part) | 150 | 150 | 120 | 150 | 150 | 150 |
| Type of polymer (A) | P-1 | P-2 | P-3 | P-2 | P-2 | P-2 |
| Amount of polymer (A) (part) | 45 | 45 | 36 | 30 | 45 | 45 |
| Acid value of polymer (A) | 145 | 148 | 193 | 145 | 148 | 148 |
| Weight ratio polymer(A)/pigment | 0.3 | 0.3 | 0.3 | 0.2 | 0.3 | 0.3 |
| Step 1 | | | | | | |
| Type of water-soluble solvent | TEG | TEG | DEG | TEG | TEG | TEG |
| Amount of water-soluble solvent (part) | 95 | 150 | 52 | 150 | 150 | 225 |
| Amount of KOH (part) | 19 | 20 | 20 | 4.37 | 20 | 20 |
| Step 2 | | | | | | |
| Dispersion medium: first (part) | Water = 450 | Water = 450 | Water = 360 | Water = 450 | Water = 450 | Water = 450 |
| Dispersion medium: second (part) | TEG: water = 55/186 | TEG: water = 0/185 | DEG: water = 68/144 | TEG: water = 0/42.84 | TEG: water = 0/185 | TEG: water = 0/110 |
| Volume-average particle size of aqueous pigment dispersion (nm) | 120.5 | 110.5 | 112.1 | 136.4 | 67.6 | 74.3 |
| Number of coarse particles of 1.0 μm or more (×$10^4$ particle/ml) | 4100 | 2800 | 800 | 200 | 700 | 700 |

TABLE 4

| Aqueous pigment dispersion | |
|---|---|
| | Comparative production example 1 |
| Type of pigment | PB.15:3 |
| Amount of pigment (part) | 120 |
| Type of polymer (A) | PH-1 |
| Amount of polymer (A) (part) | 36 |
| Acid value of polymer (A) | 185 |
| Weight ratio polymer(A)/pigment | 0.3 |

TABLE 4-continued

Aqueous pigment dispersion

| | Comparative production example 1 |
|---|---|
| Step 1 | |
| Type of water-soluble solvent | DEG |
| Amount of water-soluble solvent (part) | 52 |
| Amount of KOH (part) | 20 |
| Step 2 | |
| Dispersion medium: first (part) | Water = 360 |
| Dispersion medium: second (part) | DEG: water = 68/144 |
| Volume-average particle size of aqueous pigment dispersion (nm) | 106 |
| Number of coarse particles of 1.0 μm or more (×10$^4$ particle/ml) | 9000 |

The meanings of the abbreviations used in Tables 3 and 4 above are as follows.

PB.15:3: Phthalocyanine pigment FASTOGEN Blue Pigment (produced by DIC corporation: C.I. Pigment 15:3)
PY74: Pigment Yellow 74
PR122: Pigment Red 122
PB7: Pigment black 7
KOH: 34% Aqueous potassium hydroxide solution
DEG: Diethylene glycol
TEG: Triethylene glycol
Water: Ion-exchange water <Method for Producing Binder Resin>
<Synthesis of Polycarbonate Polyurethane Resin>

To a container equipped with a thermometer, a nitrogen-gas introduction tube, and a stirrer and purged with nitrogen, 500 parts by mass of a polycarbonate polyol (number-average molecular weight: 2000) prepared by reacting 1,6-hexanediol with methyl carbonate, 37.7 parts by mass of 2,2-dimethylolpropionic acid, and 420 parts by mass of methyl ethyl ketone were added. The resulting mixture was uniformly stirred. After 92.4 parts by mass of tolylene diisocyanate had been added to the mixture, 0.1 parts by mass of dibutyltin dilaurate was added to the mixture, which was then reacted at 80° C. for 7 hours. Hereby, an organic solvent solution containing a polyurethane (PUD-1, acid value: 25 mgKOH/g) having a weight-average molecular weight of 37000 was prepared.

After the organic solvent solution had been cooled to 50° C., 29.8 parts by mass of triethylamine and 2069 parts by mass of water were added to the organic solvent solution. Then, methyl ethyl ketone was removed from the organic solvent solution at a reduced pressure at 40° C. to 60° C. The concentration of the resulting dispersion was adjusted by adding water to the dispersion. Hereby, a resin composition including the urethane resin dispersed in an aqueous medium, the resin composition having a nonvolatile content 23% by mass, was prepared.

<Production Example of Polyacrylic Resin>

A mixture of 280 parts by mass of n-butyl acrylate (hereinafter, abbreviated as "BA"), 90 parts by mass of methyl methacrylate (hereinafter, abbreviated as "MMA"), 70 parts by mass of styrene (hereinafter, abbreviated as "St"), 5 parts by mass of 2-hydroxyethyl methacrylate (hereinafter, abbreviated as "HEMA"), 13 parts by mass of acrylic acid (hereinafter, abbreviated as "AA"), 5 parts by mass of glycidyl methacrylate (hereinafter, abbreviated as "GMA"), 300 parts by mass of water, and 10 parts by mass of a nonionic emulsifier ("Noigen EA-207D" produced by DKS Co. Ltd., polyoxyethylene distyrenated phenyl ether) was emulsified using a homogenizer ("TK Homodisper" produced by PRIMIX Corporation) to form a monomer emulsion.

Into a flask equipped with a stirrer, a nitrogen-introducing tube, and a reflux condenser, 150 parts by mass of water was charged. The temperature was increased to 50° C. while stirring was performed in a nitrogen gas atmosphere. To the flask, 2 parts by mass of ammonium persulfate (hereinafter, abbreviated as "APS") and 2 parts by mass of sodium metabisulfite (hereinafter, abbreviated as "SMS") were added to form a solution. Subsequently, the monomer emulsion prepared above, 40 parts by mass of a 5-mass % aqueous APS solution, and 40 parts by mass of a 5-mass % aqueous SMS solution were added dropwise to the flask over 3 hours. While the above materials were added dropwise to the flask, the temperature inside the flask was controlled to be 50° C. to 60° C. After the addition of the materials had been completed, the reaction was continued for another 1 hour at 60° C. Hereby, an acrylic copolymer (A-1) was prepared. After the temperature had been reduced to room temperature, 7 parts by mass of 25-mass % ammonia water was added to the acrylic copolymer (A-1) in order to perform neutralization. Water was added to the resulting liquid mixture such that the resin content in the liquid mixture was 45% by mass. The mixture was then uniformly stirred. Hereby, an aqueous resin emulsion containing the acryl copolymer (A-1) was formed.

EXAMPLES

Preparation of Printing Agent

Example printing agents were each prepared by adding the binder resin to 20 parts of the specific one of the aqueous pigment dispersions such that solid content was 4% by mass relative to 100 of the amount of printing agent. Tables 5 and 6 show the names of raw materials used, the names of additives used, such as solvents, and the like. When the above materials were used in each example, sufficient stirring was performed with a dispersion stirring machine (TK Homodisper L produced by PRIMIX Corporation).

(Evaluation Methods)

In the evaluations of the printing agents, the following properties of each printing agent were measured.

<Volume-Average Particle Size>

Each of the printing agents prepared above was diluted 1000-fold, and the diluted printing agent was subjected to a measurement with a Microtrac UPA-150 (produced by Nikkiso Co., Ltd.). The measurement was conducted three times, and the average thereof was taken.

<Number of Coarse Particles>

Each of the printing agents prepared above was diluted ten-fold and then subjected to a measurement with an AccuSizer 780 APS (produced by International Business). The number of coarse particles measured was converted into the number of particles contained in 1 ml of the original aqueous pigment dispersion that is not diluted. In Tables 5 and 6, the number of the particles is expressed in (×10$^4$ particle/ml).

<Test of Printing with Printing Agent>
<Screen Printing>

An image formed by screen printing with an auto screen printing machine (produced by Tsujii Dyeing Machine Industry Co., Ltd.) was evaluated. Specifically, each of the inks was applied to a polyester-cotton fabric by printing with a 135-mesh screen having a striped pattern. Subsequently, the fabric was dried at 120° C. for 2 minutes and then heated at 150° C. for 2 minutes.

<Ink Jet Printing>

Each of the inks was charged into an ink cartridge included in an ink jet printer (MJ-510C produced by Seiko Epson Corporation), and an image was printed with the ink jet printer. Specifically, each of the inks was applied to a polyester-cotton fabric by printing. Subsequently, the fabric was dried at 120° C. for 2 minutes and then heated at 150° C. for 2 minutes.

<Test of Fastness to Washing>

Each of the printed fabrics prepared by ink-jet printing was repeatedly subjected to a test conforming to the A-4 method described in JIS L 0844:2005 30 times and then graded on a scale of Class 1 to Class 5 on the basis of the evaluation criteria of a visual method based on Grey Scale For Assessing Change In Colour described in JIS L 0801:2004. A printed fabric in which the degree of fading was the largest was evaluated as Class 1. The closer to Class 5 the grade, the smaller the degree of fading.

<Test of Fastness to Rubbing>

Each of the printed fabrics prepared by ink-jet printing was subjected to both dry and wet tests with a Gakushin rubbing fastness tester in accordance with JIS L 0849:2004 and then graded on a scale of Class 1 to Class 5 on the basis of the evaluation criteria of a visual method based on Grey Scale For Assessing Change In Colour described in JIS L 0801:2004. A printed fabric in which the degree of fading was the largest was evaluated as Class 1. The closer to Class 5 the grade, the smaller the degree of fading.

<Method for Evaluating Feeling>

Each of the printed fabrics prepared by ink-jet printing was examined by touching with a hand and evaluated on the basis of the following criteria.

◯: The boundaries between the printed portion and the fabric were imperceptible or slightly perceptible when touched by a hand.

Δ: The boundaries between the printed portion and the fabric were perceptible when touched by a hand.

x: The boundaries between the printed portion and the fabric were clearly perceptible and hard when touched by a hand.

A preferable example of the other method for evaluating feeling is a method in which, in accordance with JIS L 1913:2010, evaluation is made on the basis of bending resistance determined with a bending resistance tester (e.g., a cantilever method, a Gurley method, or a Handle-O-Meter method). The lower the bending resistance, the softer the feeling. The higher the bending resistance, the harder the feeling.

Tables 5 and 6 show the composition and evaluation results of each of the printing agents prepared in Examples and Comparative examples. Note that, in Tables 5 and 6, the compositions are expressed in parts.

TABLE 5

| | | | Example 1 | Example 2 | Example 3 | Example 4 | Example 5 | Example 6 | Example 7 | Example 8 |
|---|---|---|---|---|---|---|---|---|---|---|
| Printing agent composition | Aqueous pigment dispersion | Production example | 1 | 1 | 2 | 2 | 3 | 4 | 5 | 6 |
| | | Pigment | PB.15:3 | PB.15:3 | PB.15:3 | PB.15:3 | PB.15:3 | PR.122 | PY.74 | CB.7 |
| | | Polymer | P-1 | P-1 | P-2 | P-2 | P-3 | P-2 | P-2 | P-2 |
| | | Amount added to ink | 20 | 20 | 20 | 20 | 20 | 20 | 20 | 20 |
| | Binder resin | Name of sample | PUD-1 | A-1 | PUD-1 | A-1 | PUD-1 | PUD-1 | PUD-1 | PUD-1 |
| | | Solid content in ink (%) | 4 | 4 | 4 | 4 | 4 | 4 | 4 | 4 |
| | Surfactant | Surfynol 440 | 4 | 4 | 4 | 4 | 4 | 4 | 4 | 4 |
| | Water-soluble organic solvent | triethylene glycol monobutyl ether | 5 | 5 | 5 | 5 | 5 | 5 | 5 | 5 |
| | Humectant | Glycerin | 30 | 30 | 30 | 30 | 30 | 30 | 30 | 30 |
| | | Ion-exchange water | Balance | Balance | Balance | Balance | Balance | Balance | Balance | Balance |
| | | Total | 100 | 100 | 100 | 100 | 100 | 100 | 100 | 100 |
| Evaluations of printing agent | Volume-average particle size (nm) | | 96 | 98 | 95 | 99 | 105 | 97 | 95 | 90 |
| | Number of coarse particles of 1.0 μm or more (×10⁴ particle/ml) | | 201 | 196 | 178 | 189 | 300 | 180 | 185 | 190 |
| Evaluations of printed fabric | Results of visual inspection of printed fabric (screen) | | Good | Good | Good | Good | Good | Good | Good | Good |
| | Results of visual inspection of printed fabric (ink jet) | | Good | Good | Good | Good | Good | Good | Good | Good |
| | Fastness to washing | | Class 3.5 | Class 3 | Class 3.5 | Class 3 | Class 2.5 | Class 3.5 | Class 4 | Class 3.5 |
| | Fastness to rubbing (dry) | | Class 3.5 | Class 3 | Class 3.5 | Class 3 | Class 3 | Class 3.5 | Class 4 | Class 3.5 |
| | Fastness to rubbing (wet) | | Class 3 | Class 2.5 | Class 3 | Class 2.5 | Class 2.5 | Class 3 | Class 3.5 | Class 3 |
| | Evaluation of feeling | | ◯ | ◯ | ◯ | ◯ | ◯ | ◯ | ◯ | ◯ |

TABLE 6

| | | | Comparative example 1 | Comparative example 2 | Comparative example 3 |
|---|---|---|---|---|---|
| Printing agent composition | Aqueous pigment dispersion | Production example | Comparative production example 1 | Comparative production example 1 | Comparative production example 1 |
| | | Pigment | PB.15:3 | PB.15:3 | PB.15:3 |
| | | Polymer | PH-1 | PH-1 | PH-1 |
| | | Amount added to ink | 20 | 20 | 20 |

TABLE 6-continued

|  |  |  | Comparative example 1 | Comparative example 2 | Comparative example 3 |
|---|---|---|---|---|---|
|  | Binder resin | Name of sample | PUD-1 | A-1 | — |
|  |  | Solid content in ink (%) | 4 | 4 | 0 |
|  | Surfactant | Surfynol 440 | 4 | 4 | 4 |
|  | Water-soluble organic solvent | triethylene glycol monobutyl ether | 5 | 5 | 5 |
|  | Humectant | Glycerin | 30 | 30 | 30 |
|  | Ion-exchange water |  | Balance | Balance | Balance |
| Total |  |  | 100 | 100 | 100 |
| Evaluations of printing agent | Volume-average particle size (nm) |  | 106 | 101 | 106 |
|  | Number of coarse particles of 1.0 μm or more (×10⁴ particle/ml) |  | 1923 | 1886 | 1923 |
| Evaluations of printed fabric | Results of visual inspection of printed fabric (screen) |  | Good | Good | Good |
|  | Results of visual inspection of printed fabric (ink jet) |  | Good | Good | Good |
|  | Fastness to washing |  | Class 2.5 | Class 2 | Class 1 |
|  | Fastness to rubbing (dry) |  | Class 2.5 | Class 2.5 | Class 2 |
|  | Fastness to rubbing (wet) |  | Class 2 | Class 2 | Class 1 |
|  | Evaluation of feeling |  | ○ | ○ | ○ |

The above results confirm that printed portions formed using the printing agents according to the present invention (Examples 1 to 8) all had good fastness, while printed portions formed using the printing agents prepared in Comparative examples 1 to 3 had poor fastness.

BRIEF DESCRIPTION OF DRAWINGS

The FIGURE is a schematic diagram illustrating a microreactor used in the present invention.

REFERENCE SIGNS LIST

1: T-MICROMIXER M1
2: T-MICROMIXER M2
3: T-MICROMIXER M3
4: TUBE REACTOR R1
5: TUBE REACTOR R2
6: TUBE REACTOR R3
7: TUBE REACTOR FOR PRECOOLING P1
8: TUBE REACTOR FOR PRECOOLING P2
9: TUBE REACTOR FOR PRECOOLING P3
10: TUBE REACTOR FOR PRECOOLING P4

The invention claimed is:

1. A printing agent comprising a pigment, a pigment dispersant, water, an organic solvent, and a binder resin, the pigment dispersant being a polymer (A) including an anionic group, the polymer (A) having a solubility in water of 0.1 g/100 ml or less, a number-average molecular weight of 1000 to 6000, and an acid value of 40 to 400 mgKOH/g.

2. The printing agent according to claim 1, wherein the polymer (A) is a polymer represented by General Formula (1) below,

[Chem. 1]

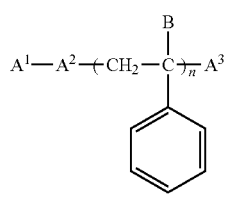

(1)

(where $A^1$ represents a residue of an organolithium initiator; $A^2$ represents a polymer block including a monomer having an aromatic ring or a heterocyclic ring; $A^3$ represents a polymer block including an anionic group; n represents an integer of 1 to 5; and B represents an aromatic group or an alkyl group).

3. The printing agent according to claim 1, wherein the polymer (A) has an acid value of 40 to 190 mgKOH/g.

4. The printing agent according to claim 1, wherein the polymer (A) is a polymer produced by performing living anionic polymerization with a microreactor.

5. The printing agent according to claim 1, wherein the binder resin is a polyurethane resin or a polyacrylic resin.

6. A printed fabric produced by applying, to a fabric, the printing agent according to claim 1.

7. A method for producing a printing agent, the method comprising the following steps conducted in this order: a step in which a dispersion mixture including a polymer (A), a basic compound, a water-soluble organic solvent, and a pigment is prepared, the polymer (A) including an anionic group, the polymer (A) having a solubility in water of 0.1 g/100 ml or less, the polymer (A) being capable of forming microparticles in water when a degree of neutralization of the anionic group achieved by the basic compound is 100%, the polymer (A) having a number-average molecular weight of 1000 to 6000; a step in which the dispersion mixture is mixed with water to form an aqueous pigment dispersion; and a step in which the aqueous pigment dispersion is mixed with a diluent solvent, a binder resin, and an additive for printing agents.

* * * * *